United States Patent
Yamamoto et al.

[19]

[11] Patent Number: 5,948,503

[45] Date of Patent: *Sep. 7, 1999

[54] FINE FIBER REINFORCED THERMOPLASTIC ELASTOMER COMPOSITION AND PROCESS FOR PRODUCING SAME

[75] Inventors: Shinji Yamamoto; Kazuyoshi Fujii; Hideo Kurihara; Tatsuo Wada, all of Ichihara, Japan

[73] Assignee: UBE Industries, Ltd., Ube, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/521,412

[22] Filed: Aug. 30, 1995

[51] Int. Cl.$^6$ .................................. B32B 5/00; C08F 8/00
[52] U.S. Cl. ..................... 428/113; 428/105; 428/295.4; 428/357; 428/359; 428/367; 428/372; 428/392; 428/395; 428/401; 427/180; 427/202; 427/212; 264/109; 525/105; 525/181; 525/184
[58] Field of Search ..................... 525/105, 181, 525/184; 428/424.2, 372, 105, 113, 295.4, 357, 359, 367, 392, 395, 401; 264/109, 111, 122, 128; 427/212, 180, 202

[56] References Cited

U.S. PATENT DOCUMENTS 5,006,603  4/1991  Takaki et al. .
5,049,610  9/1991  Takaki et al. .

FOREIGN PATENT DOCUMENTS

| 58-79037 | 5/1983 | Japan . |
|---|---|---|
| 59-43041 | 3/1984 | Japan . |
| 63-81137 | 4/1988 | Japan . |
| 1-104636 | 4/1989 | Japan . |
| 2-248448 | 4/1990 | Japan . |
| 2-92625 | 4/1990 | Japan . |
| 2-251550 | 10/1990 | Japan . |
| 5-88860 | 12/1993 | Japan . |

Primary Examiner—Richard Weisberger
Attorney, Agent, or Firm—Finnegan, Henderson, Farabow, Garrett & Dunner, L.L.P.

[57] ABSTRACT

A fine fiber-reinforced elastomer composition (A) having a high elastic modulus, mechanical strength and creep resistance includes (a) 100 parts by weight of elastic component having a glass-transition temperature of 0° C. or less, (b) 30 to 500 parts by weight of a polyolefin component and (c) 10 to 500 parts by weight of a polyamide component dispersed in the fine fiber form in the matrix consisting of the components (a) and (b), these components (a), (b) and (c) being chemically bonded to each other through a binding agent (d), for example, a silane coupling agent, and is useful for producing an elastic material having a high elastic modulus, an excellent fatigue resistance and a high isotropy, by admixing an additional elastic component (B) to the elastomer composition (A).

33 Claims, 3 Drawing Sheets

REACTIONS BETWEEN COMPONENT (a), (b) AND (c).

Ny: POLYAMIDE (NYLON6)
NR: ELASTRIC POLYMER (NATURAL RUBBER)
PP: POLYOLEFIN (POLYPROPYLENE)

FINE FIBER REINFORCED THERMOPLASTIC ELASTOMER COMPOSITION AND PROCESS FOR PRODUCING SAME

BACKGROUND OF THE INVENTION

1. Field of the Invention

The present invention relates to a fine fiber-reinforced thermoplastic elastomer composition, a process for producing the thermoplastic elastomer composition, a fine fiber-reinforced elastic material and a process for producing the elastic material.

More particularly, the present invention relates to a fine fiber-reinforced thermoplastic elastomer composition in which a matrix comprising an elastic component and a polyolefin component is reinforced by a fine fibrous polyamide component, a process for producing the thermoplastic elastomer composition at a high efficiency, a fine fiber-reinforced elastic material comprising the thermoplastic elastomer composition and an additional elastic component, having excellent elastic modulus, tensile strength, and processability, and a process for producing the elastic material.

The fine fiber-reinforced elastomer composition and elastic material are useful for producing outside parts, for example, tread and side wall, of a tire, inside parts, for example, a carcass, braded edge, belt and chafer, of a tire, and industrial products, for example, hoses, belts, rubber rolls, and rubber crawlers.

2. Description of the Related Art

It is known that polyolefin resin materials, for example, polypropylene and ethylene-propylene copolymer materials, are widely used for forming bumpers and trim of motorcars and casings and parts of home electric appliances.

In most of these polyolefin resin materials, an elastic polymer, for example, EPDM (ethylene-propylene-diene terpolymer) is blended to enhance the impact strength thereof.

For example, Japanese Unexamined Patent Publication (Kokai) No. 01-104,636 discloses a polymer composition comprising a polypropylene resin and an ethylene-propylene copolymeric rubber which are graft-bonded to an organic short fibrous material through a coupling agent.

Also, Japanese Examined Patent Publication (Kokoku) No. 02-248,448 discloses a thermoplastic resin composition comprising a thermoplastic resin and a mixture of a chlorinated polyethylene and short fibrous polyamide.

Further, Japanese Unexamined Patent Publication (Kokai) No. 2-251,550 discloses a fiber-reinforced composition comprising chlorinated polyethylene and a polyamide in the form of fine fiber and dispersed in the chlorinated polyethylene.

Conventional fiber-reinforced elastomeric materials comprise a composition comprising short fibers dispersed in a vulcanizable rubber material, for example, natural rubber polyisoprene, polybutadiene rubber or ethylene-propylene copolymeric rubbers, to enhance the elastic modulus and mechanical strength thereof. The conventional fiber-reinforced elastomeric materials are produced by blending an elastomeric material with short fibers comprising nylon, polyester or water-insolubilized polyvinyl alcohol, and optionally vulcanizing the blend.

The conventional fiber-reinforced elastomeric materials produced by the above-mentioned method are unsatisfactory in mechanical strength and elongation when used as a material for forming tires of motorcars. Accordingly, there is a demand for a new fiber-reinforced elastomeric material having an enhanced mechanical strength and elongation.

In response to this demand, there have been made attempts to provide an improved elastomeric material reinforced by using fine short fibers, for example, nylon fibers, having an average thickness of less than one μm. This type of fiber-reinforced elastomeric material can be produced by melt-kneading a mixture of a vulcanizable rubber material, a nylon resin and a binding agent at a temperature equal to or higher than the melting temperature of the nylon resin, extruding the kneaded melt through an extruding die at a temperature equal to or higher than the melting temperature of the nylon resin to form a thread, and drawing or press-rolling the thread. Optionally, the mixture is further admixed with a vulcanizing agent, and the drawn or press-rolled material is vulcanized. This type of process is disclosed in Japanese Unexamined Patent Publication (Kokai) No. 58-79037 in which a precondensate of a resol type alkyl phenol-formaldehyde resin is used as a binding agent, or Japanese Unexamined Patent Publication (Kokai) No. 59-43,041 in which a precondensate of a novolak type alkylphenol-formaldehyde resin is used as a binding agent, or in Japanese Unexamined Patent Publication (Kokai) No. 63-81,137 in which a silane coupling agent is employed as a binding agent.

In the conventional elastomeric materials, it is known that when an elastic polymer is blended into the polyolefin resin, the resultant blend material exhibits a reduced rigidity and mechanical strength, a decreased stress at yield and a decreased creep resistance. To prevent the reduction in the rigidity, mechanical strength, stress at yield and creep resistance, glass fibers and/or an inorganic filler is blended, in addition to the elastic polymer, into the polyolefin resin. However, an increase in the content of the glass fibers or the inorganic filler causes the resultant shaped article to exhibit an unpleasant appearance and an increased specific gravity. Generally, the conventional fiber-reinforced elastomer compositions are advantageous in not only having an excellent tensile strength and elastic modulus, but also in having a high tear strength and a high elongation. However, the conventional fiber-reinforced elastomer composition is disadvantageous in that since the fine fibers, for example, fine nylon fibers, are dispersed in an elastic matrix, the resultant composition is difficult to pelletize and thus can be produced only in the form of a sheet or lumps. Also, the conventional fiber-reinforced elastomer composition is disadvantageous in that when the reinforcing fibers, for example, nylon fibers are mixed in a large amount, the resultant composition becomes too stiff.

Due to the above disadvantages, the conventional elastomer composition must be cut by hand when it is admixed with additional vulcanizable elastic material and/or vulcanizing agent. Also, sometimes, the reinforcing fibers and the additional vulcanizable elastic material are difficult to evenly disperse in the elastomer composition. To prevent these disadvantages, it is necessary to prolong the melt-kneading time or to admix additional vulcanizable elastomeric material or other additive into the elastomer composition after softening the elastomer composition by heating. This necessity results in a decrease in productivity of the fiber-reinforced elastomer composition and in increase in production cost.

The conventional fiber-reinforced elastomer composition is advantageous in having a high elastic modulus and fatigue resistance in the orientation direction of the reinforcing fibers. However, the conventional fiber-reinforced elastomer composition is disadvantageous in that the elastic modulus and fatigue resistance in a direction at a right angle to the orientation direction of the reinforcing fibers in the composition are significantly low.

SUMMARY OF THE INVENTION

An object of the present invention is to provide a fine fiber-reinforced thermoplastic elastomer composition having an enhanced impact strength, rigidity, mechanical strength, creep resistance and a low specific gravity, a process for producing the thermoplastic elastomer composition, a fine fiber-reinforced elastic material comprising the thermoplastic elastomer composition, and a process for producing the elastic material.

Another object of the present invention is to provide a fine fiber-reinforced thermoplastic elastomer composition which can be produced at a high productivity at a low cost and having an excellent elastic modulus and fatigue resistance not only in the direction parallel to the orientation direction of the reinforcing fibers but also in the direction at a right angle to the orientation direction of the reinforcing fibers, a process for producing the thermoplastic elastomer composition, a fine fiber-reinforced elastic material comprising the thermoplastic elastomer composition, and a process for producing the elastic material.

The fine fiber-reinforced elastomer composition of the present invention, comprises
- (a) 100 parts by weight of an elastic component comprising at least one elastic polymer having a glass-transition temperature of 0° C. or less;
- (b) 30 to 500 parts by weight of a polyolefin component comprising at least one polyolefin; and
- (c) 10 to 500 parts by weight of a polyamide component comprising at least one thermoplastic amide polymer having amide group-containing recurring units,
  the polyamide component (c) being in the form of fine fibers and dispersed in a matrix formed from the elastic component (a) and the polyolefin component (b), and the elastic component (a), the polyolefin component (b) and the polyamide component (c) being chemically bonded to each other, through at least one binding agent (d).

The process of the present invention for producing a fine fiber-reinforced thermoplastic elastomer composition comprises the steps of:
- (1) melt-kneading a mixture comprising (a) 100 parts by weight of an elastic component comprising at least one elastic polymer having a glass-transition temperature of 0° C. or less, (b) 30 to 500 parts by weight of a polyolefin component comprising at least one polyolefin and (d) a binding agent, at a temperature equal to or higher than the melting temperature of the mixture, to provide a matrix mixture;
- (2) further kneading the matrix mixture together with (c) 10 to 500 parts by weight of a polyamide component comprising at least one thermoplastic amide polymer having amide group-containing recurring units, at a temperature equal to or higher than the melting temperature of the polyamide component (c), to provide a precursory composition in which the polyamide component (c) is dispersed in the form of fine particles in the matrix mixture, and
- (3) extruding the precursory composition through an extruding die at a temperature equal to or higher than the melting temperature of the polyamide component (c), while cooling and drawing or press-rolling the extruded precursory composition at a temperature lower than the melting temperature of the polyamide component (c), to form the polyamide component (c) into fine fibers dispersed in a matrix comprising the elastic component (a) and the polyolefin component (b) and to cause the components (a), (b) and (c) to be chemically bonded to each other through the binding agent (d).

The fine fiber-reinforced elastic material of the present invention comprises
- (A) the fine fiber-reinforced thermoplastic elastomer composition as mentioned above, and
- (B) an additional elastic component comprising at least one elastic polymer having a glass-transition temperature of 0° C. or less, and knead-mixed with the fine fiber-reinforced thermoplastic elastomer composition (A),
  with respect to 100 parts of the total weight of the elastic component (a) and the additional elastic component (B), the polyolefin component (b) being present in an amount of 1 to 40 parts by weight, and the polyamide component (c) being present in an amount of 1 to 70 parts by weight.

The process of the present invention for producing the fine fiber-reinforced elastic material, comprises knead-mixing the fine fiber-reinforced thermoplastic elastomer composition (A) as mentioned above with an additional elastic component (B) comprising at least one elastic polymer having a glass-transition temperature of 0° C. or less, at a temperature equal to or higher than the melting temperature of the polyolefin component (b) and lower than the melting temperature of the polyamide component (c),
  with respect to 100 parts of the total weight of the elastic component (a) and the additional elastic component (B), the polyolefin component (b) being present in an amount of 1 to 40 parts by weight, and the polyamide component (c) being present in an amount of 1 to 70 parts by weight.

BRIEF DESCRIPTION OF THE INVENTION

FIG. 1 shows chemical reactions between elastic component (a), a polyolefin component (b) modified with a silane coupling agent (d), and a polyamide component (c) modified with a silane coupling agent (d'), FIG. 2 is a graph showing stress-strain curves of the sheets made from the fiber-reinforced elastomer compositions of Example 2 and Comparative Example 1, FIG. 3 is a microscopic photograph showing fine fibers of the polyamide component (c) dispersed in the fine fiber-reinforced elastomer composition sheet of Example 1.

DESCRIPTION OF THE PREFERRED EMBODIMENTS

Figure 1:
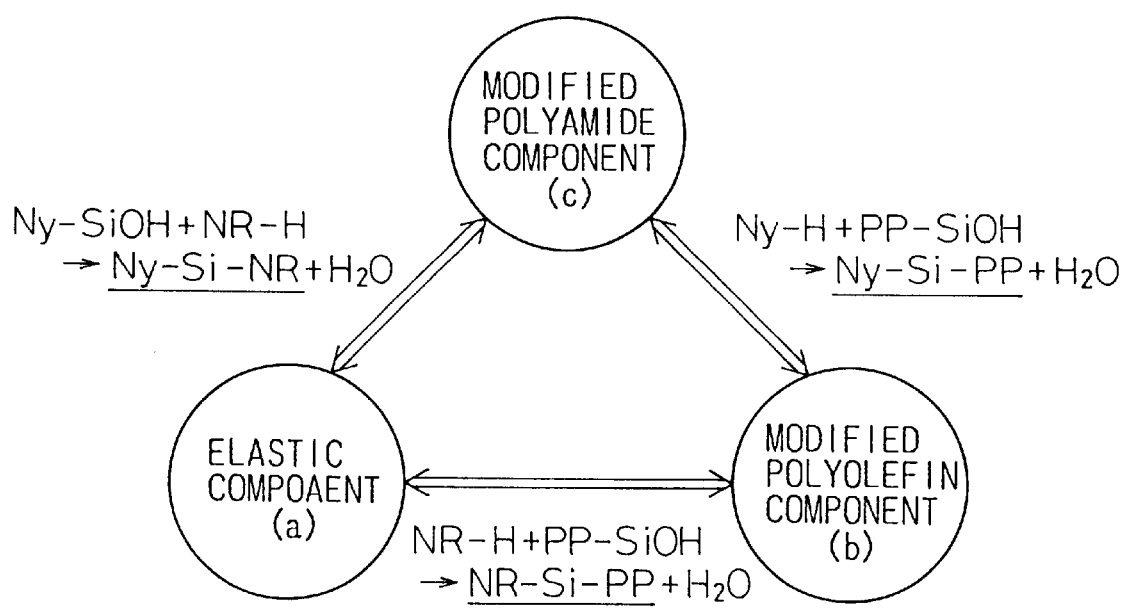

The fine fiber-reinforced elastomer composition of the present invention comprises:
- (a) 100 parts by weight of an elastic component,
- (b) 30 to 500 parts by weight of a polyolefin component, and
- (c) 10 to 500 parts by weight of a polyamide component in the form of fine fibers and dispersed in a matrix formed from the elastic component (a) and the polyolefin component (b).

The elastic component (a) comprises at least one elastic polymer having a glass transition temperature of 0° C. or less, preferably from −120° C. to −20° C.

The elastic polymer usable for the elastic component (a) is preferably selected from the group consisting of natural rubber; poly-aliphatic diene elastomers, for example, isoprene rubber, butadiene rubber, styrene-butadiene copolymer rubbers, acrylonitrile-butadiene copolymer rubbers, butyl rubbers, chlorinated butyl rubbers, bromated butyl rubbers, acrylonitrile-chloroprene copolymer rubbers, acrylonitrile-isoprene copolymer rubbers, acrylate-butadiene copolymer rubbers, vinyl pyridine-butadiene copolymer rubbers, vinyl pyridine-styrene-butadiene terpolymer rubbers, styrene-chloroprene copolymer rubbers, styrene-isoprene copolymer rubbers, carboxylated styrene-butadiene copolymer rubbers, carboxylated acrylonitrile-butadiene copolymer rubbers, styrene-butadiene block copolymers, styrene-isoprene block copolymers, carboxylated styrene-butadiene block copolymers, and carboxylated styrene-isoprene block copolymers; polyolefin elastomers, for example, ethylene-propylene copolymer rubbers, ethylene-propylene-diene terpolymers, ethylene-butene copolymer rubbers, ethylene-butene-diene terpolymers, chlorinated polyethylene and chlorosulfonated polyethylene; polymethylene elastomers having polymethylene group as a backbone chain, for example, acrylic rubbers, ethylene acrylic rubbers, poly chloro-trifluoroethylene, fluorine-containing rubbers, and hydrogenated acrylonitrile-butadiene rubbers; elastomers having an oxygen atom-containing organic group as a backbone chain, for example, epichlorohydrin polymer, ethylene oxide-epichlorohydrin-allylglycidylether terpolymers and propylene oxide-allylglycidylether copolymers; silicon rubbers, for example, polyphenylmethylsiloxane, polydimethylsiloxane, polymethylethylsiloxane, and polymethylbutylsiloxane; and elastomers having a nitrogen and oxygen atom-containing organic group as a backbone chain, for example, nitroso rubbers, polyesterurethane rubbers and polyetherurethane rubbers.

Also, the elastic polymers usable for the elastic component (a) include epoxy; silane or maleic acid-modification products of the above-mentioned elastic polymers.

Further, the elastic polymers usable for the elastic component (a) are preferably selected from thermoplastic styrene block copolymers, olefinic elastomers, urethane elastomers, polyester elastomers, polyamide elastomers, 1,2-polybutadiene elastomers and vinyl chloride elastomers.

The polyolefin component (b) comprises at least one polyolefin. The polyolefin component preferably has a melting temperature of 80° C. to 250° C. or a Vicat softening temperature of 50° C. to 200° C.

The polyolefin usable for the polyolefin component (b) is preferably selected from homopolymers and copolymers of olefins having 2 to 8 carbon atoms;

copolymers of at least one olefin having 2 to 8 carbon atoms with at least one member selected from the group consisting of aromatic vinyl compounds, for example, styrene, chlorostyrene and α-methylstyrene, vinyl acetate, acrylic acid, acrylic acid esters, methacrylic acid, methacrylic acid esters and vinyl silane compounds; and halogenated polyolefins.

Particularly, the polyolefin is preferably selected from the group consisting of high density polyethylenes, low density polyethylenes, polypropylene, propylene-ethylene block copolymers, ethylene-propylene random copolymers, linear low density polyethylenes, poly 4-methylpentene-1, polybutene-1, polyhexene-1, ethylene-vinyl acetate copolymers, ethylene-vinyl alcohol copolymers, ethylene-acrylic acid copolymers, ethylene-methyl acrylate copolymers, ethylene-ethyl acrylate copolymers, ethylene-propyl acrylate copolymers, ethylene-butyl acrylate copolymers, ethylene-2-ethylhexyl acrylate copolymers, ethylene-hydroxyethyl acrylate copolymers, ethylene-vinyl trimethoxysilane copolymers, ethylene-vinyl triethoxysilane copolymers, ethylene-vinylsilane copolymers, ethylene-styrene copolymers, chlorinated polyethylenes, bromated polyethylenes, and chlorosulfonated polyethylenes.

More preferably, the polyolefin is selected from the group consisting of high density polyethylenes, low density polyethylenes, polypropylene, ethylene-propylene block copolymers, ethylene-propylene random copolymers, linear low density polyethylene, poly 4-methylpentene-1, ethylene-vinyl acetate copolymers, and ethylene-vinyl alcohol copolymers. Among the above-mentioned polymers, the polyolefins having a melt flow index of 0.2 to 50 g/10 min are most preferable for the polyolefin component (b).

The above-mentioned polyolefins may be employed alone or in a mixture of two or more thereof.

The polyamide component (c) comprises at least one thermoplastic amide polymer having amide group-containing recurring units in a backbone chain and preferably having a melting temperature of 135° C. to 350° C., more preferably 160° C. to 265° C.

The amide polymer usable for the polyamide component (c) is preferably selected from thermoplastic polyamides and polyureas. More preferably, the thermoplastic polyamides are employed for the polyamide component (c), because the thermoplastic polyamides can form tough fibers by melt-extruding and drawing procedures.

The thermoplastic polyamide usable for the polyamide component (c) is preferably selected from the group consisting of nylon 6, nylon 66, nylon 6-nylon 66 copolymers, nylon 610, nylon 612, nylon 46, nylon 11, nylon 12, nylon MXD6, polycondensates of xylylenediamine with adipic acid, polycondensates of xylylenediamine with azelaic acid, polycondensates of xylylenediamine with sebacic acid, polycondensates of tetramethylenediamine with terephthalic acid, polycondensates of hexamethylenediamine with terephthalic acid, polycondensates of octamethylenediamine with terephthalic acid, polycondensates of trimethyl-hexamethylenediamine with terephthalic acid, polycondensates of decamethylenediamine with terephthalic acids, polycondensates of undecamethylenediamine with terephthalic acid, polycondensates of dodecamethylenediamine with terephthalic acid, polycondensates of tetramethylenediamine with isophthalic acid, polycondensates of hexamethylenediamine with isophthalic acid, polycondensates of octamethylenediamine with isophthalic acids, polycondensates of trimethylhexamethylenediamine with isophthalic acid, polycondensates of decamethylenediamine with isophthalic acid, polycondensates of undecamethylenediamine with isophthalic acid and polycondensates of dodecamethylenediamine with isophthalic acid.

Among the above-mentioned thermoplastic polyamides, more preferably, at least one member selected from nylon 6, nylon 66, nylon 6-nylon 66 copolymers, nylon 610, nylon 612, nylon 46, nylon 11, and nylon 12 is more preferably employed for the polyamide component (c).

The thermoplastic polyamide preferably has a molecular weight of 10,000 to 200,000.

In the thermoplastic elastomer composition of the present invention, a mixture of the elastic component (a) with the polyolefin component (b) forms a matrix, and the polyamide component (c) is dispersed in the form of fine fibers in the matrix.

In the matrix, the elastic component (a) is dispersed in the form of a plurality of islands in a sea consisting of the polyolefin component (b). Also, in the matrix, the elastic component (a) and the polyolefin component (b) are preferably chemically bonded at the interfaces between the components (a) and (b) to each other through the binding agent (d).

As mentioned above, a major portion of the polyamide component (c) dispersed in the matrix is in the fine fiber form. Preferably, 70% by weight or more, more preferably 80% by weight or more, still more preferably 90% by weight or more, of the polyamide component (c) is dispersed in the fine fiber form in the matrix.

The fine fibers of the polyamide dispersed in the matrix preferably have an average thickness of 1 $\mu$m or less, more preferably 0.05 to 0.8 $\mu$m and an average aspect ratio (ratio of fiber length to fiber thickness) of 10 or more.

Preferably, the polyamide component (c) is chemically bonded to the elastic component (a) and the polyolefin component (b) at interfaces between the components through the binding agent (d'). The binding agent (d') for the polyamide component (c) may be the same as or different from the binding agent (d) for the elastic component (a) and the polyolefin component (b).

The percentage of a portion of the component (c), bonded to the components (a) and (b) is preferably 0.1 to 20%, more preferably 0.5 to 10%, based on the total weight of the component (c). The binding percentage of the polyamide component (c) is determined by the following method.

A fine fiber-reinforced thermoplastic elastomer composition of the present invention is treated with a solvent capable of dissolving only the elastic component (a) and the polyolefin component (b), for example, xylene, while refluxing, to remove the components (a) and (b), and the weight $W_c$ of the remaining polyamide component (c) is measured.

Then the percentage of the $W_C$ based on the total weight $W_{co}$ of the polyamide component (c), namely $W_C/W_{Co} \times 100$, is calculated. This percentage is referred to as a binding percentage of the polyamide component (c), hereinafter.

The chemical bonding of the polyamide component (c) to the elastic component (a) and the polyolefin component (b) in the thermoplastic elastomer composition of the present invention can be confirmed by the following method.

A fine fiber-reinforced thermoplastic elastomer composition of the present invention is treated with a solvent capable of dissolving only the elastic component (a) and the polyolefin component (b), for example, xylene, while refluxing the solvent, the remaining polyamide component (c) is dissolved in another solvent and subjected to NMR analysis. In the resultant NMR chart, certain peaks derived from the elastic component (a) and the polyolefin component (b) are observed. Accordingly, peaks indicate that portions of the elastic component (a) and the polyolefin component (b) are chemically bonded to the surface portions of the polyamide component fibers (c). The chemical bonds are derived from the binding agent (d'). The binding agent (d) and (d') will be explained in detail hereinafter.

In the thermoplastic elastomer composition of the present invention, the components (a), (b) and (c) are present in the following contents.

With respect to 100 parts by weight of the elastic component (a), the polyolefin component (b) is present in a content of 30 to 500 parts by weight, preferably 30 to 300 parts by weight, more preferably 40 to 200 parts by weight. If the content of the polyolefin component (b) is less than 30 parts by weight per 100 parts by weight of the elastic component (a), the resultant fine fiber-reinforced thermoplastic elastomer composition exhibits a low creep resistance. Namely, when the resultant elastomer composition is kept under a load for a predetermined time so as to allow it to be elongated, and then the load is removed, the remaining elongation, that is creep, of the elastomer composition is too large. Also, when the content of the polyolefin component (b) is more than 500 parts by weight, the resultant fine fiber-reinforced thermoplastic elastomer composition exhibits an unsatisfactory impact resistance.

The polyamide component (c) is present in a content of 10 to 500 parts by weight, preferably 20 to 400 parts by weight, more preferably 30 to 300 parts by weight, per 100 parts by weight of the elastic component (a). If the content of the polyamide component (c) is less than 10 parts by weight, the resultant thermoplastic elastomer composition exhibits an unsatisfactory creep resistant. Also, if the polyamide component (c) content is more than 500 parts by weight, the content of the reinforcing fine fibers in the thermoplastic elastomer composition is too small and thus the resultant thermoplastic elastomer composition is difficult to mold into a shaped article having a smooth surface.

The above-mentioned fine fiber-reinforced thermoplastic elastomer composition can be produced by the process of the present invention.

In the process of the present invention, (1) a mixture comprising (a) 100 parts by weight of an elastic component comprising at least one elastic polymer having a glass-transition temperature of 0° C. or less, (b) 30 to 500 parts by weight of a polyolefin component comprising at least one polyolefin and (d) a bonding agent, is melt-kneaded at a temperature equal to or higher than the melting temperature of the mixture, to provide a matrix mixture;

(2) the resultant matrix mixture is further kneaded together with (c) 10 to 500 parts by weight of a polyamide component comprising at least one thermoplastic amide polymer having amide group-containing recurring units, at a temperature equal to or higher than the melting temperature of the polyamide component (c), to provide a precursory composition in which the polyamide component (c) is dispersed in the form of fine particles in the matrix mixture; and (3) the resultant precursory composition is extruded through an extruding die at a temperature equal to or higher than the melting temperature of the polyamide component (c), while cooling and drawing or press-rolling the extruded precursory composition at a temperature lower than the melting temperature of the polyamide component (c), to form the polyamide component (c) into fine fibers dispersed in a matrix comprising the elastic component (a) and the polyolefin component (b) and to cause the components (a), (b) and (c) to be chemically bonded to each other through the binding agent (d).

In an embodiment of the melt-kneading step (1), for example, the polyolefin component (b) is melt-kneaded together with the binding agent (d) to modify the component (b) with the binding agent (d), then the binding agent (d)-modified polyolefin component (b) is mixed with the elastic component (a), and the mixture is melt-kneaded at a temperature equal to or higher than the melting temperature of the mixture to further modify the elastic component (a) with the binding agent (d) and to provide a matrix mixture.

In another embodiment of the melt-kneading step (1), the elastic component (a), the polyolefin component (b) and the binding agent (d) are mixed altogether and then the mixture is subjected to the melt-kneading procedure.

The melt-kneading procedure can be carried out by using a conventional apparatus for melt-kneading resins or rubbers, the melt-kneading apparatus may be selected from Banbury's mixer, kneaders, knead-extruders, open kneading rolls, monoaxial kneaders and biaxial kneaders. In view of the fact that the melt kneading procedure can be continuously carried out and completed within a short time, the biaxial extrude-kneaders are most preferably employed for the process of the present invention.

In the process of the present invention, the binding agent (d) is employed preferably in a content of 0.1 to 2.0 parts by weight, more preferably 0.2 to 1.0 part by weight, based on 100 parts by weight of the polyolefin component (b). If the content of the binding agent (d) is less than 0.1 parts by weight per 100 parts by weight of the polyolefin component (b), the resultant matrix may exhibit an unsatisfactory mechanical strength. Also, if the content of the binding agent (d) is more than 2.0 parts by weight, the resultant matrix may exhibit an unsatisfactory elastic modulus.

The binding agent (d) may comprises at least one member selected from conventional coupling agents for organic polymeric materials. The coupling agents include silane coupling agents, titanate coupling agents, phenol-formaldehyde precondensates, for example, novolak type alkylphenol-formaldehyde precondensates, resol type alkylphenol-formaldehyde precondensates, novolak type phenol-formaldehyde procondensates, and resol type phenol-formaldehyde procondensates, unsaturated carboxylic acids, unsaturated carboxylic acid derivatives, and organic peroxides.

The most preferable coupling agents are silane coupling agents because they cause the elastic component (a) and the polyolefin component (b) to be not gelated or less gelated, and to be firmly bonded with each other therethrough.

The silane coupling agents include vinyltrimethoxysilane, vinyltriethoxysilane, vinyl-tris($\beta$-methoxy-ethoxy)silane, vinyl triacetylsilane, $\gamma$-methacryloxypropyl trimethoxysilane, $\beta$-(3,4-epoxycyclohexyl) ethyltrimethoxysilane, $\gamma$-glycidoxypropylmethyldimethoxysilane, $\gamma$-glycidoxypropylmethyldiethoxysilane, $\gamma$-glycidoxypropylethyldimethoxysilane, N-$\beta$-(aminoethyl) aminopropyltrimethoxysilane, N-$\beta$-(aminoethyl) aminopropylmethyldimethoxysilane, N-$\beta$-(aminoethyl) aminopropylethyldimethoxysilane, $\gamma$-aminopropyltriethoxysilane, N-phenyl-$\gamma$-aminopropyltrimethoxysilane, $\gamma$-[N-($\beta$-methacryloxyethyl)-N,N-dimethyl-ammonium(chloride)] propylmethoxysilane, and styryldiaminosilane. Among these compounds, preferable to silane coupling agents are those having reactive groups which are easily eliminated by receiving a hydrogen atom from hydrogen atom-containing groups, for example, alkoxyl groups of the compound to be reacted with the silane coupling agents, and/or polar groups and vinyl groups.

The titanate coupling agents usable for the present invention include isopropylisostearoyl titanate, isopropyltri(N-aminoethyl)titanate, tetra (2,2-diallyloxymethyl-1-butyl)bis-(ditridecyl)phosphite titanate, bis(dioctylpysophosphate) oxyacetate titanate, isopropyltrioctanoyl titanate, isopropylisostealoyldiacryl titanate, and isopropyldimethacroyldiacryl titanate.

The unsaturated carboxylic acids and unsaturated carboxylic acid derivatives usable for the present invention include $\alpha,\beta$-unsaturated carboxylic acids, cycloaliphatic unsaturated carboxylic acids, alkenyl carboxylic acid and derivatives of the above-mentioned carboxylic acids. The unsaturated carboxylic acids and these derivatives are preferably selected from acrylic acid, methacrylic acid, maleic acid, fumaric acid, itaconic acid, vinyl benzoic acid, vinylphthalic acid, endobicyclo(2,2,1)-5-haptene-2,3-carboxylic acid, di-4-cyclohexene-1,2-carboxylic acid, octa-decenylsuccinic acid, and anhydrides, esters and metal salts of the above-mentioned acids.

The organic peroxides usable for the present invention includes 1,1-di-tert-butylperoxy-3,3,5-trimethylcyclohexane, 1,1-di-tert-butylperoxycyclohexane, 2,2-di-tert-butylperoxybutane, n-butyl 4,4-di-tert-butylperoxyvalerianate, 2,2-bis (4,4-di-tert-butylperoxycyclohexane)propane, 2,2,4-trimethylpentylperoxyneodecanate $\alpha$-cumyl peroxyneodecanate, tert-butyl peroxyneohexanate, tert-butyl peroxypivalate, tert-butyl peroxyacetate, tert-butyl peroxylaurate, tert-butyl peroxybenzoate, and tert-butyl peroxyisophthalate. Among these compounds, preferable organic peroxides are those having a one minute half-life temperature equal to or about 30° C. above the melt-kneading temperature, particularly in the range of from 80° C. to 260° C., more preferably 110° C. to 200° C.

In the above-mentioned binding agents, the silane coupling agents are most preferable, because they do not gelate or gelate the elastic component (a) and the polyolefin component (b) less.

Where the silane coupling agents are employed as a binding agent, the organic peroxide can be used together with the silane coupling agent. The joint-use of the organic peroxide with the silane coupling agent has the following advantages.

The organic peroxide causes radicals to be generated on the molecular chains of the polyolefin component (b), and the radicals react with the silane coupling agent so as to promote the reaction of the polyolefin component (b) with the coupling agent.

In this case, the organic peroxide is used preferably in an amount of 0.01 to 1.0 parts by weight per 100 parts by weight of the polyolefin component (b).

Where the elastic component (a) comprises a natural rubber, polyisoprene, or styrene-isoprene-styrene block copolymer, no organic peroxide may be employed. When the elastic polymer, for example, the natural rubber, polyisoprene or styrene-isoprene-styrene block copolymer which has a isoprene structure, is kneaded at a high temperature, the backbone chains of the polymer are cut due to mechanochemical reactions, and certain peroxide groups having —COO. radicals are generated at the terminals of the cut molecules. The peroxide groups have the same function as of the organic peroxide.

In the further kneading step (2) of the process of the present invention, a mixture of the matrix mixture with 10 to 500 parts by weight of a polyamide component (c) at a temperature no lower than the melting temperature of the polyamide component (c), to provide a precursory composition. During the further kneading step (2), the polyamide component (c) is dispersed in the form of fine particles in the matrix mixture. Before the further kneading step (2), the polyamide component (c) may be modified or may not be modified with a binding agent (d').

The modification of the polyamide component (c) with the binding agent (d') can be effected by melt-kneading the polyamide component (c) mixed with the binding agent (d') at a temperature equal to or higher than the melting temperature of the polyamide component (c).

The binding agent (d') for the polyamide component (c) is selected from the same compounds usable for the binding agent (d) for the elastic component (a) and the polyolefin component (b). Also, the binding agent (d') used for the polyamide component (c) is the same as or different from the binding agent (d) used for the elastic component (a) and the polyolefin component (b).

Preferably, the binding agent (d') for the polyamide component (c) comprises at least one member selected from the group consisting of silane coupling agents, titanium coupling agents, unsaturated carboxylic acids, unsaturated carboxylic acid derivatives, and organic peroxides.

The silane coupling agents are most preferably employed as the binding agent (d'), because they do not causes the polyamide component (c) to be gelated, or cause it to be gelated less.

The silane coupling agents are selected from those having reactive groups, for example, alkoxyl groups, capable of bonding to nitrogen groups in the amide groups (—NHCO—) of the polyamide component (c) by a dehydration reaction or alcohol-removal reaction. This type of silane coupling agents are preferably selected from vinylalkoxysilanes, for example, vinyltriethoxysilane, vinyltriethoxysilane and vinyl-tris($\beta$-methoxyethoxy)silane, vinyl triacetylsilane, $\gamma$-methacryloxypropyl trimethoxysilane, $\gamma$-[N-($\beta$-methacryloxyethyl)-N,N-dimethyl-ammonium(chloride)] propylmethoxysilane, N-$\beta$-(aminoethyl)8-aminopropyltrimethoxysilane, and $\gamma$-ureidopropyltriethoxysilane and styryldiaminosilane.

The melt kneading procedure for the polyamide component (c) mixed with the binding agent (d') can be carried out by using the conventional melt-kneading apparatus usable for the melt-kneading step (1).

In the further kneading step (2), the unmodified polyamide component (c), or the modified polyamide component (c) with the binding agent (d'), or a mixture of the unmodified polyamide component (c) with the binding agent (d') is admixed with the matrix mixture and the resultant admixture is further kneaded at a temperature equal to or higher than the melting temperature of the polyamide component (c) which is non-modified or modified one with the binding agent (d').

When the binding agent (d') is employed, the content of the binding agent (d) is preferably 0.1 to 5.5 parts by weight, more preferably 0.2 to 5.5 parts by weight, still more preferably 0.2 to 3 parts by weight, per 100 parts by weight of the total amount of the polyamide component (c) and the binding agent (d').

The binding agent (d') applied to the polyamide component (c) effectively enhances the chemical bond of the polyamide component (c) to the elastic component (a) and the polyolefin component (b) in the matrix, so as to improve the creep resistance of the resultant fine fiber-reinforced thermoplastic elastomer composition of the present invention.

When the content of the binding agent (d') is more than 5.5 parts by weight, the polyamide component (c) may be excessively modified and thus may not be formed into fine fibers, and therefore the resultant elastic composition may exhibit an unsatisfactory creep resistance.

Even if the binding agent (d') is not employed, portions of the polyamide component (c) can be chemically bonded to the elastic component (a) and polyolefin component (b) modified with the binding agent (d) at the interfaces between the components (c) and the components (a) and (b), during the further kneading step.

Where the elastic component (a) has a certain melting temperature, the further kneading temperature is preferably equal to or higher than the melting temperature of the elastic component (a).

If the further kneading temperature is lower than the melting temperature of the polyamide component (c), the polyamide component (c) cannot be dispersed in the form of fine particles in the matrix, and thus in the extruding step (3), the polyamide component (c) cannot be dispersed in the form of fine fibers in the matrix.

Preferably, the further kneading step (2) is carried out at a temperature of at least 30° C. above the melting temperature of the polyamide component (c).

When the polyamide component (c) is modified with the binding agent (d'), the further kneading procedure (2) is carried out preferably by using a conventional melt-kneading apparatus, for example, Banbury mixer, melt-kneader, knead-extruder, open kneading roll, monoaxial kneader or biaxial kneader.

When the polyamide component (c) is not modified with the binding agent (d'), the further kneading step (2) is carried out preferably using a melt-kneading apparatus capable of kneading at a high shearing speed, for example, Banbury mixer or a biaxial kneader.

Where the polyamide component (c) is modified with the silane coupling agent, the —NH group of the polyamide component (c) is attached by the silane coupling agent so that a hydrogen atom is withdrawn from the —NH-group and the remaining nitrogen atom reacts with the silane coupling to form a nitrogen-silicon bond. Also, the silane coupling agent-modified polyamide component (c) is knead-mixed into the matrix mixture, the silane coupling agent residue of the modified polyamide component (c) reacts with backbone chains or side chains of the elastomer molecules in the elastic component (a) so as to form nitrogen-silicon-carbon bonds between the polyamide component (c) and the elastic component (a). Also, the silane coupling-modified polyamide component (c) can react with the polyolefin component (b) so as to form nitrogen-silicon-carbon bonds therebetween.

The resultant precursory composition is subjected to the extruding step (3) in accordance with the process of the present invention.

In the extruding step (3), the precursory composition is melt-extruded through an extruding die, for example, melt-spinning orifice or T-die, slit or inflation die, at a temperature equal to or higher than the melting temperature of the polyamide component (c) and the extruded precursory composition stream is cooled and drawn or press-rolled at a temperature lower than the melting temperature of the polyamide component (c).

Preferably, the extruding temperature is at least 20° C., preferably 20° C. to 50° C., above the melting temperature of the polyamide component (c).

During the melt-extruding procedure, the particles of the polyamide component (c) are connected to fine fibers and during the drawing or press-rolling procedure, the fine fibers of the polyamide component (c) are drawn to enhance the orientation and the mechanical strength of the fine fibers. The drawing or press-rolling procedure is carried out at a temperature lower than the melting temperature of the polyamide component (c).

When the precursory composition is extruded through a melt-spinning orifice, the extruded melt stream in the form of a thread or yarn is cooled while being drafted, and the drafted thread is wound around a bobbin or drum. The term "drafting" refers to a procedure in which the extruded thread is taken up at a take-up speed higher than the extruding speed through the orifice. The draft ratio is a ratio of the take-up speed to the extruding speed.

In the extruding step (3) of the process of the present invention, the draft ratio is preferably 1.5 to 100, more preferably 2 to 70, still more preferably 3 to 50.

When the draft ratio is more than 1, the extruded thread is drawn while being cooled.

The extruded thread may be subjected to a continuous rolling (milling) procedure by using a pressure roll. Otherwise, the precursory composition is melt extruded through a T die or inflation die, and the extruded tape is drafted (drawn) while being cooled and then wound-up around a winding roll. Otherwise, the extruded tape may be subjected to a continuous rolling (milling) procedure by using a pressure roll.

As a result of the extruding step (3) a fine fiber-reinforced thermoplastic elastomer composition in the form of a thread, yarn or tape. The thermoplastic elastomer composition may be pelletized by using a pelletizer or employed as a yarn prepreg.

The fine fiber-reinforced elastic material of the present invention comprises
- (A) the fine fiber-reinforced thermoplastic elastomer composition of the present invention as mentioned above, and
- (B) an additional elastic component comprising at least one elastic polymer having a glass-transition temperature of 0° C. or less, preferably –20° C. or less, and knead-mixed with the above-mentioned fine fiber-reinforced thermoplastic elastomer composition (A).

In the elastic material of the present invention, the polyolefin component (b) is present in a content of 1 to 40 parts by weight, preferably 2 to 30 parts by weight, and the polyamide component (c) is present in a content of 1 to 70 parts by weight, preferably 2 to 55 parts by weight, per 100 parts of the total weight of the elastic component (a) and the additional component (B).

The elastic polymer for the additional elastic component (B) may be selected from the same components as those usable for the elastic component (a). The additional elastic component (B) may consist of a single elastic polymer or a mixture of two or more elastic polymers.

The composition of the additional elastic composition (B) may be the same as or different from that of the elastic component (a).

In the elastic material of the present invention, if the content of the polyolefin component (b) is more than 40 parts by weight, per 100 parts of the total weight of the elastic component (a) and the additional elastic component (B), the resultant elastic material exhibits an unsatisfactory elasticity. Also, if the content of the polyolefin component (b) is less than 1 part by weight, the resultant elastic material exhibits unsatisfactory physical properties, for example, a poor fatigue resistance.

If the content of the polyamide component (c) is more than 70 parts by weight, the resultant elastic material has unsatisfactory tensile strength ultimate elongation, and processability. Also, if the content of the polyamide component (c) is less than 1 part by weight, the resultant elastic material exhibits an unsatisfactory mechanical strength. Generally, the ratio in weight of the thermoplastic elastomer composition (A) to the additional elastic component (B) is not limited to a specific ratio, as long as the contents of the olefin component (b) and the polyamide component (c) are in the above-mentioned specific ranges, based on the total weight of the elastic component (a) and the additional elastic component (B). Nevertheless, where the ratio in weight of the additional elastic component (B) to the elastomer composition (A) is in the range of from 20:1 to 0.1:1, more preferably from 10:1 to 0.5:1, the resultant elastic material exhibits an enhanced kneading-processability.

In the elastic material of the present invention, the elastic component (a) and the additional component (B) may be vulcanizable or vulcanized.

In the process of the present invention for producing the fine fiber-reinforced elastic material, the fine fiber-reinforced thermoplastic elastomer composition (A) of the present invention is knead-mixed with an additional elastic component (B) comprising at least one elastic polymer having a glass-transition temperature of 0° C. or less, at a temperature equal to or higher than the melting temperature of the polyolefin component (b) and lower than the melting temperature of the polyamide component (c). The contents of the polyolefin component (b) and the polyamide component (c) are controlled as mentioned above.

If the knead-mixing procedure is carried out at a temperature lower than the melting temperature of the polyolefin component (b), the fine fibers of the polyamide component (c) are not uniformly dispersed in the matrix.

If the knead-mixing procedure is carried out at a temperature higher than the melting temperature of the polyamide component (c), the fine fibers of the polyamide component (c) are melted and converted to spherical particles.

The knead-mixing temperature is preferably at least 5° C. above the melting temperature of the polyolefin component (c).

In the process for producing the elastic material, the fine fiber-reinforced thermoplastic elastomer composition is preferably in the form of pellets, because the pellets can be easily and evenly mixed with the additional elastic component (B) which is preferably in the form of pellets, and in the resultant elastic material, the reinforcing fine fibers of the polyamide component (c) can be uniformly distributed.

In the process for producing the elastic material, when the elastic component (a) and the additional elastic component (B) are vulcanizable, the fine fiber-reinforced thermoplastic elastomer composition (A) and the additional elastic component (B) may be knead-mixed with a vulcanizing agent and optionally a vulcanizing accelerator.

The vulcanizing agent is employed preferably in a content of 0.1 to 5.0 parts by weight, more preferably 0.5 to 3.0 parts by weight, per 100 parts by weight of the total weight of the elastic component (a) and the additional elastic component (B). The vulcanizing accelerator is employed preferably in a content of 0.01 to 2.0 parts by weight, more preferably 0.1 to 1.0 part by weight, per 100 parts by weight of the sum of the elastic component (a) and the additional elastic component (B).

The vulcanizing agent usable for the present invention can be selected from conventional vulcanizing agents, for example, sulfur, organic peroxides, for example, dicumyl peroxide and cummen hydroperoxide vulcanizing resins, for example, alkylphenol-formaldehyde resins, melamine-formaldehyde resins and triazine-formaldehyde resins, and metal oxides, for example, magnesium oxide, zinc oxide and lead monoxide.

The vulcanizing accelerator usable for the present invention can be selected from conventional vulcanizing accelerators, for example, aldehyde-ammonium compounds, aldehyde-amine compounds, guanidine compounds, thiourea compounds, thiazol compounds, thiuram compounds, dithiocarbonate compounds and xanthate compounds.

When the vulcanizing agent is admixed to the fine fiber-reinforced thermoplastic elastomer composition (A) and the additional elastic component (B), the resultant elastic material is vulcanized preferably at a temperature of 100 to 180° C. and lower than the melting temperature of the polyamide component (c). If the vulcanizing temperature is higher than the melting temperature of the polyamide component (c), the fine fibers of the polyamide component (c) are melted and converted to spherical particles. The resultant vulcanized material cannot be reinforced by the fine fibers.

The fine fiber-reinforced elastic material optionally contains an additive comprising at least one member selected from, for example, reinforcing materials, for example, carbon black, white carbon, activated calcium carbonate, super finely pulverized magnecium silicate, high polystyrene resins, phenolic resins, lignin, modified melanine resins, cumarone-indene resins, and petroleum resins; fillers, for example, calcium carbonate, basic magnesium carbonate, clay, zinc oxide, diatomaceous earth, regenerated rubbers, powdered rubbers, powdered ebonite; stabilizers, for example, amine-aldehyde compounds, amine-ketone compounds, amines, phenolic compounds, imidazol compounds, sulfur-containing antioxidants, and phosphorus-containing antioxidants; and coloring agents.

In the thermoplastic elastomer composition of the present invention, a plurality of fine reinforcing fibers of the polyamide component (c) are dispersed in the matrix comprising the elastic component (a) and the polyolefin component (b), and chemically bonded to the components (a) and (b) at the interfaces between them. However, the elastomer composition is, as a whole, thermoplastic. Therefore, the elastomer composition of the present invention can be shaped by the same shaping method, for example, an injection molding method, extrusion molding method and press-forming method, as that for the common thermoplastic resins. The resultant shaped articles exhibits a high rigidity and mechanical strength and a light weight.

The fine fiber-reinforced thermoplastic elastomer composition of the present invention can be utilized as a yarn prepreg. The yarn prepreg can be used to provide a mat or woven into a plain weave, tire cord-like weave or satin weave, or shaped by a stamping machine.

The elastic material produced from the fine fiber-reinforced thermoplastic elastomer composition (A) and the additional elastic component (B) contains a plurality of fine fibers of the polyamide component (C) dispersed in a matrix comprising the elastic component (a) and the additional elastic component (B) and portions of the polyolefin component (b) is grafted to the fine fibers of the polyamide component (c) to form crystalline lamellas extending from the fine fiber surfaces outward. The crystalline lamellas serve as anchors for the fine fibers and enhance the interface bonding of the fine fibers to the elastic matrix. Another portion of the polyolefin component (b) is grafted in the form of fine particles having a size of 0.1 $\mu$m or less to the elastic component (a) and evenly distributed in the elastic matrix, so as to reinforce the resultant elastic material.

Accordingly, in comparison with the conventional fiber-reinforced elastic material, the fine fiber-reinforced elastic material of the present invention exhibits a high hardness, high elastic modulus, an excellent fatigue resistance, a low temperature increase (in the same hardness), and even in the direction at a right angle to the orientation of the fine fibers, an enhanced elastic modulus and fatigue resistance.

EXAMPLES

The present invention will be further explained by the following examples.

In the examples, the following tests were carried out.

(1) Density: ASTM D1505

(2) Modulus of tensile elasticity:

Complex elastic modulus was measured by using Vibron DDV-11 (trademark) made by Orientec Co., at a temperature of 23° C.

(3) Tensile yield strength: ASTM D638

(4) Tensile breaking strength: ASTM D638

(5) Creep: A specimen having a length $L_0$ was stretched under a load of 50 kg/cm$^2$ for one hour, then the load was removed and the length L of the specimen was measured.

The creep of the specimen was calculated in accordance with the following equation.

$$\text{Creep } (\%) = (L - L_0)/L_0 \times 100$$

The smaller the creep value, the higher the creep resistance.

(6) Formation of fine fibers of a polyamide component (C) in a fine fiber-reinforced thermoplastic elastomer composition: A fine fiber-reinforced thermoplastic elastomer composition was treated in a mixed solvent consisting of 50 parts by volume of o-dichlorobenzene and 50 parts by volume of xylene at a temperature of 100° C. while refluxing the solvent, to remove the elastic component (a) and the polyolefin component (b). The remaining polyamide component (c) in the form of fine fibers was observed and evaluated by a microscope.

(7) Average thickness of fine fibers of polyamide component (c): 200 fine fibers of the polyamide component (c) were subjected to the measurement of thickness by a microscope and an average of the measured thicknesses was calculated.

(8) Formability: A fine fiber-reinforced thermoplastic elastomer composite was shaped into a sheet having a thickness of 1 to 2 mm by a hot press at a temperature of 180° C. The surface smoothness of the resultant sheet was observed and evaluated by naked eye, as follows Class Formability 4. The resultant sheet had a very smooth surface.
3. The resultant sheet had a satisfactory surface.
2. The resultant sheet had a rough surface.
1. Sheet formation was difficult, or the resultant sheet had a very rough surface.

(9) modulus of elasticity, tensile strength and ultimate elongation of fine fiber-reinforced elastic material: A No. 3, dumbbell was provided from a fine fiber-reinforced elastic material by punching, and subjected to measurement of modulus of elasticity, tensile strength and ultimate elongation of the elastic material in accordance with JIS K 6251.

(10) Fatigue resistance at constant rate of loading: A No. 3 dumbbell was provided from a fine fiber-reinforced elastic material by punching, and stretched while repeatedly applying a load of 70 kg/cm$^2$ until breaking, and the number of the load applications until break was counted.

(11) Temperature increase ($\Delta$T)

The temperature increase ($\Delta$T) of the elastic material during the vulcanizing procedure was measured by using a Goodrich Flexmeter (Trademark) in accordance with ASTM D 623.

Examples 1 to 4

In each of Examples 1 to 4, a fine fiber-reinforced thermoplastic elastomer composition was prepared from the following components.

As an elastic component (a), ethylene-propylene copolymer EPDM (Trademark: EP-22, made by Nihon Goseigomu K. K.) and a glass transition temperature of −60° C. was employed. As a polyolefin component (b), polypropylene resin (trademark: Ubepolypro J109, made by Ube Industries, Ltd.) having a melting temperature of 165° C. to 170° C. and a meltflow index of 9 g/10 min was employed. Also, as a polyamide component (c), Nylon 6 resin (trademark: Ubenylon 1022B, made by Ube Industries, Ltd.) having a melting temperature of 215° C. to 220° C. and a molecular weight of 30,000, was employed.

The polyolefin component (b) was modified with 0.5 part by weight of γ-methacryloxypropyltri-methoxysilane and 0.1 part by weight of n-butyl-4,4-di-(tert-butylperoxy) valerate, per 100 parts by weight of the polyolefin component (b), by melt-kneading at a temperature of 180° C. by using a twin screw extruder.

The polyamide component (c) was modified with N-β (aminoethyl)γ-amino-propyltrimethoxysilane in an amount of 1.0 parts by weight per 100 parts by weight of the component (c) by melt-kneading at a temperature of 240° C. by using a twin screw extruder.

The modified polyolefin component (b) in the amount as indicated in Table 1 was mixed with elastic component (a) in the amount as indicated in Table 1, and the mixture was melt-kneaded by a Banbury mixer at a temperature of 180° C. for 5 minutes to provide a matrix mixture. The matrix mixture was damped at a temperature of 170° C. and then pelletized.

The matrix mixture pellets were mixed with the modified polyamide component (c) in the amount as shown in Table 1, and the mixture was melt-kneaded by a twin screw extruder at a temperature of 240° C. and then pelletized to provide a precursory composition. The precursory composition pellets were melt extruded by a single screw extruder into a thread form, while cooling and taking-up at a draft ratio of 10, and then pelletized by using a pelletizer. The taking-up operation was carried out at room temperature. The pellets were shaped into a sheet having a thickness of 1 mm, by using a press at a temperature of 1800° C. The resultant sheet had smooth surfaces.

A portion of the sheet was cut to provide a specimen. The specimen was subjected to the tests (6) and (7) wherein the elastic component (a) and the polyolefin component (b) are removed by the mixed solvent, and the remaining polyamide component (c) was observed by microscope. It was confirmed that the polyamide component (c) was formed into fine fibers having an average thickness of 0.2 to 0.3 $\mu$m. When the remaining fine fibers were subjected to an NMR measurement, the resultant NMR chart indicated peaks corresponding to the polyamide component (nylon 6) (c) and the elastic component (EPDM) (a) and the polyolefin component (PP) (b).

The other portions of the fine fiber-reinforced elastomer composition sheet were cut into dumbbell-shaped specimens and subjected to the physical property test. The test results are shown in Table 1.

The tensile modulus of elasticity of the specimen was 3690 to 4621 kg/cm$^2$, and the tensile strength was 79 to 193 kg/cm$^2$ as shown in Table 1. The tensile modulus of elasticity and the tensile strength increased with an increase in the content of the fine fibers of the polyamide component (c).

The fine fiber-reinforced thermoplastic elastomer composition sheets of Examples 1 to 4 exhibited no tensile yield stress.

The creep resistance was from 1% in Example 4 to 10% in Example 1. The creep resistance increased with increase in the content of the fine fibers of the polyamide component (c).

Figure 2:
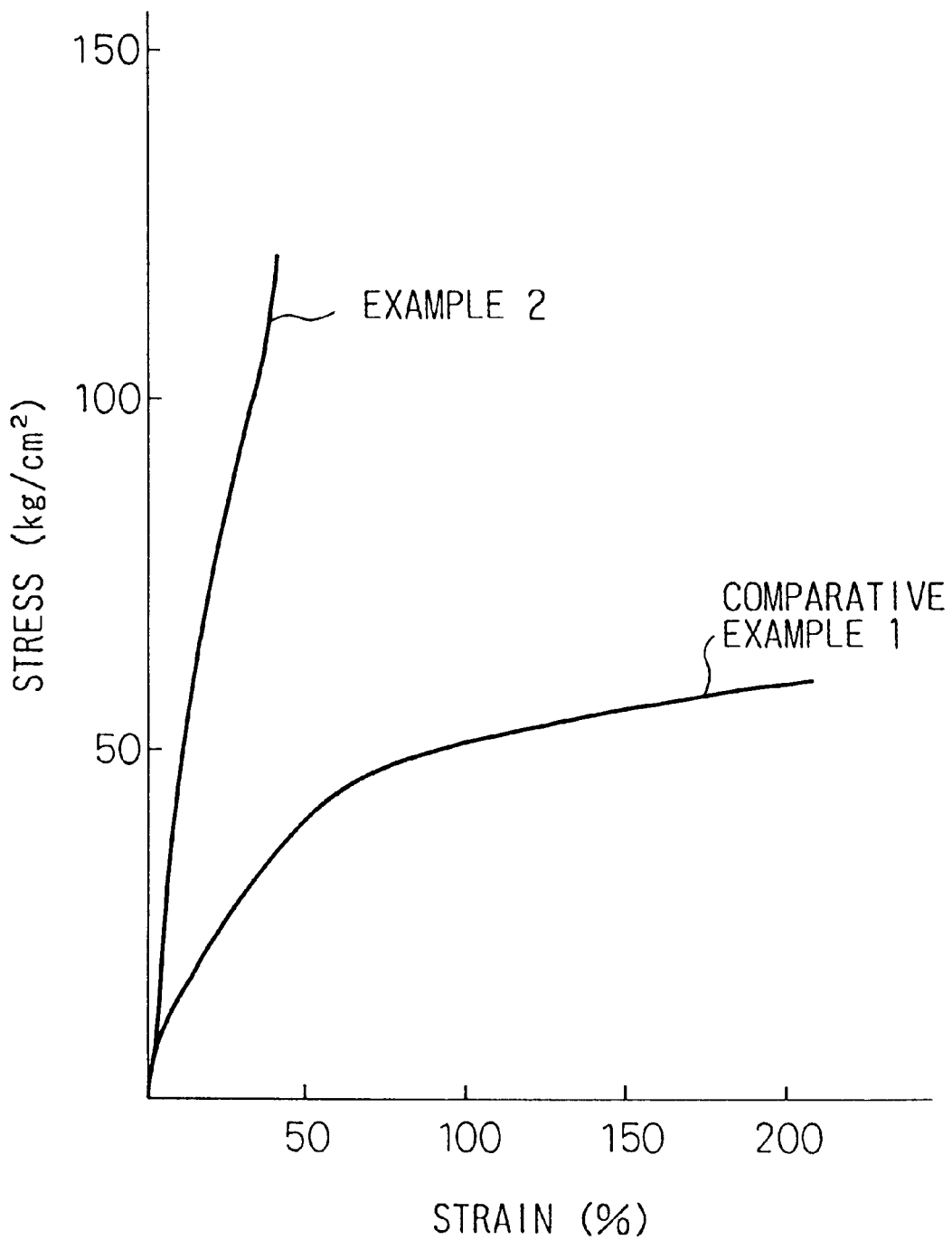

A stress-strain curve of the fine fiber-reinforced elastomer composition sheet of Example 2 is shown in FIG. 2.

Figure 3:
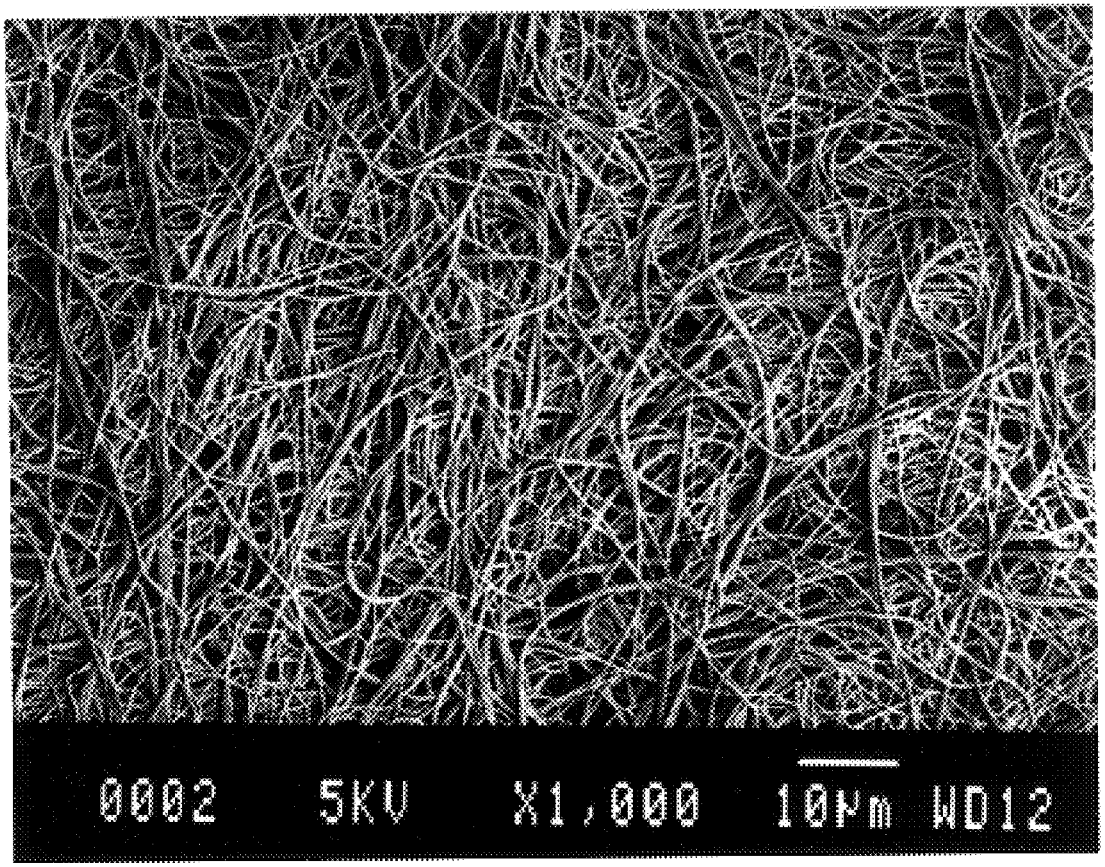

Also, FIG. 3 shows the fine fibers of the polyamide component (c) in the fine-fiber-reinforced thermoplastic elastomer composition sheet of Example 1.

Comparative Example 1

The same procedures and test as in Example 1 were carried out except that the components (a), (b) and (c) were employed in the amounts indicated in Table 1. Namely no polyamide component (c) was employed, and the matrix mixture prepared from the modified polyolefin component (b) and the elastic component (a) was formed into a sheet. The sheet was then subjected to the tests.

The test results are shown in Table 1.

Although the tensile modulus of elasticity of the resultant elastomer composition sheet was 3611 kg/cm$^2$ which was similar to that in Examples 1 to 4, the tensile strength of the sheet was 45 kg/cm$^2$ which was significantly lower than that of Examples 1 to 4, and the creep was 68% which was significantly larger than that of Examples 1 to 4.

Also, the creep resistance of the sheet was 150% under a load of 50 kg/cm$^2$, which was significantly high.

The stress-strain curve of the thermoplastic elastomer composition sheet prepared in Comparative Example 1 is shown in FIG. 2.

Comparative Example 2

The same procedures and tests as in example 1 were carried out except that the polyamide component (c) was employed in an amount of 500 parts by weight.

The precursory composition pellets were extracted at the same draft as in Example 1 into a thread form, and the thread was press-formed into a sheet. The resultant sheet was not suitable for the physical property test.

The sheet was subjected to the fine fiber-observation test (6). As a result, it was found that the polyamide component (c) was distributed in the form of a film in the matrix.

Comparative Example 3

The same procedures and tests as in Example 1 were carried out except that no polyolefin component (b) was employed.

The precursory composition was extruded in the same manner as in Example, into a thread form, and the extruded thread was pelletized. The resultant thermoplastic elastomer composition pellets were press-formed into a sheet at a pressing temperature of 180° C.

The resultant sheet was subjected to the physical property tests.

The sheet exhibited a tensile modulus elasticity of 2580 kg/cm$^2$ and a tensile strength of 52 kg/cm$^2$, which are significantly lower than those of Examples 1 to 4.

From the results of the fine fiber observation tests (6) and (7) using the microscope, it was confirmed that the polyamide component (c) was in the forms of fine fibers having an average thickness of 0.3 $\mu$m.

The test results are shown in Table 1.

Example 5

The same procedures and tests as in Example 1 were carried out to prepare a fine fiber-reinforced thermoplastic elastomer composition, except that the polyamide component (c) was not modified by n-β(aminoethyl)γ-aminopropyltrimethoxysilane.

The precursory composition was extruded into the thread form at the same draft ratio as in Example 1, and pelletized. The resultant thermoplastic elastomer composition pellets were press-formed into a sheet at a temperature of 100° C. in the same manner as in Example 1. The resultant sheet was then subjected to the tests.

In this example, although the polyamide component (c) was modified with the silane compling agent, the resultant fine fiber-reinforced thermoplastic elastomer composition sheet had a tensile modulus of elasticity of 4920 kg/cm$^2$ and a tensile strength of 218 kg/cm$^2$, which are excellent. Also, the sheet exhibited substantially no tensile yield stress and a very low creep of 1%.

As a result of the microscopic observation tests (6) and (7), it was confirmed that the polyamide component (c) was in the form of fine fibers having an average thickness of 0.2 μm.

The test results are shown in Table 1.

were press-formed into a sheet at a temperature of 180° C. in the same manner as in Example 1. The resultant sheet was then subjected to the tests.

In this example, although the elastic component (a), namely EPDM, was used in an increased content of 200 parts by weight, the resultant fine fiber-reinforced elastomer composition sheet had a tensile modulus of elasticity of 3090 kg/cm$^2$ and a tensile strength of 89 kg/cm$^2$, which are quite satisfactory. Also, the sheet exhibited no tensile yield stress and a low creep of 7%.

As a result of the microscopic observation tests (6) and (7), it was confirmed that the polyamide component (c) was in the form of fine fibers having an average thickness of 0.2 μm.

The test results are shown in Table 2.

Example 7

The same procedures and tests as in Example 1 were carried out except that the polyolefin component (b) was employed in an amount of 77 parts by weight, and the

TABLE 1

| | | Example No. | | | | | | | |
|---|---|---|---|---|---|---|---|---|---|
| | | Example | | | | | Comparative Example | | |
| Item | | 1 | 2 | 3 | 4 | 5 | 1 | 2 | 3 |
| Composition (parts by weight) | Polyolefin component (b) (pp) (*)$_1$ | 100 | 100 | 100 | 100 | 100 | 100 | 100 | 0 |
| | Elastic component (a) (EPDM) (*)$_2$ | 100 | 100 | 100 | 100 | 100 | 100 | 100 | 100 |
| | Polyamide component (c) (PA6) (*)$_3$ | 50 | 100 | 200 | 300 | 100 | 0 | 500 | 100 |
| Test result | Density g/ml | 0.921 | 0.950 | 0.993 | 1.010 | 0.962 | 0.880 | — | 0.980 |
| | Tensile modulus of elasticity (kg/cm$^2$) | 3960 | 3940 | 4340 | 4621 | 4920 | 3611 | — | 2580 |
| | Tensile yield stress (kg/cm$^2$) | — | — | — | — | — | — | — | 10 |
| | Tensile strength (kg/cm$^2$) | 79 | 120 | 156 | 193 | 218 | 45 | — | 52 |
| | Creep (%) | 10 | 5 | 2 | 1 | 1 | 68 | — | Broken |
| Polyamide component (c) | Fine fiber-formation | Good | Good | Good | Good | Good | — | Bad | Good |
| | Average thickness of fine fibers (μm) | 0.2 | 0.3 | 0.2 | 0.3 | 0.2 | — | — | 0.3 |
| Formability (at 180° C.) | | 4 | 4 | 4 | 4 | 4 | 4 | 1 | 2 |

Note:
(*)$_1$ . . . PP: Polypropylene
(*)$_2$ . . . EPDM: Ethylene-Propylene-diene terpolymer
(*)$_3$ . . . PA6: Nylon 6

Example 6

The same procedures and tests as in Example 1 were carried out except that the polyolefine component (b) was employed in an amount of 50 parts by weight, and the polyamide component (c) was employed in an amount of 75 parts by weight.

The precursory composition was extruded into the thread form at the same draft ratio as in Example 1, and pelletized. The resultant thermoplastic elastomer composition pellets were press-formed into a sheet at a temperature of 180° C. in the same manner as in Example 1. The resultant sheet was then subjected to the tests.

In this example, although the elastic component (a), namely EPDM, was used in an increased content of 130 polyamide component (c) was employed in an amount of 88 parts by weight.

The precursory composition was extruded into the thread form at the same draft ratio as in Example 1, and pelletized. The resultant thermoplastic elastomer composition pellets were press-formed into a sheet at a temperature of 180° C. in the same manner as in Example 1. The resultant sheet was then subjected to the tests.

parts by weight, the resultant fine fiber-reinforced thermoplastic elastomer composition sheet had a tensile modulus of elasticity of 3560 kg/cm² and a tensile strength of 100 kg/cm², the sheet exhibited substantially no tensile yield stress and a low creep of 6%.

As a result of the microscopic observation tests (6) and (7), it was confirmed that the polyamide component (c) was in the form of fine fibers having an average thickness of 0.3 μm.

The test results are shown in Table 2.

Example 8

The same procedures and tests as in example 1 were carried out except that the polyolefin component (b) was employed in an amount of 200 parts by weight, and the polyamide component (c) was employed in an amount of 150 parts by weight.

The precursory composition was extruded into the thread form at the same draft ratio as in Example 1, and pelletized. The resultant thermoplastic elastomer composition pellets were press-formed into a sheet at a temperature of 180° C. in the same manner as in Example 1. The resultant sheet was then subjected to the tests.

In this example, the resultant fine fiber-reinforced thermoplastic elastomer composition sheet had a tensile modulus of elasticity of 4870 kg/cm² and a tensile strength of 102 kg/cm², which are quite satisfactory. Also, the sheet exhibited substantially no tensile yield stress and a very low creep of 2%.

As a result of the microscopic observation tests (6) and (7), it was confirmed that the polyamide component (c) was in the form of fine fibers having an average thickness of 0.3 μm.

The test results are shown in Table 2.

TABLE 2

| Item | | Example No. Example | | |
|---|---|---|---|---|
| | | 6 | 7 | 8 |
| Composition (parts by weight) | Polyolefin component (b) | 50 | 77 | 200 |
| | Elastic component (a) | 100 | 100 | 100 |
| | Polyamide component (c) | 75 | 88 | 150 |
| Test result | Density g/ml | 0.947 | 0.950 | 0.944 |
| | Tensile modulus of elasticity (kg/cm²) | 3090 | 3560 | 4870 |
| | Tensile yield stress (kg/cm²) | — | — | — |
| | Tensile strength (kg/cm²) | 89 | 100 | 102 |
| | Creep (%) | 7 | 6 | 2 |
| Polyamide component (c) | Fine fiber-formation | Good | Good | Good |
| | Average thickness of fine fibers (μm) | 0.2 | 0.3 | 0.3 |
| Formability (at 180° C.) | | 4 | 4 | 4 |

Example 9

The same procedures and tests as in Example 1 were carried out except that the elastic component (a) consisted of a natural rubber (SMR-L) in a content of 100 parts by weight. The natural rubber had a glass transition temperature of −63° C.

The precursory composition was extruded into the thread form at the same draft ratio as in Example 1, and pelletized. The resultant thermoplastic elastomer composition pellets were press-formed into a sheet at a temperature of 180° C. in the same manner as in Example 1. The resultant sheet was then subjected to the tests.

In this example, the resultant fine fiber-reinforced thermoplastic elastomer composition sheet had a tensile modulus of elasticity of 4050 kg/cm² and a tensile strength of 103 kg/cm², which are quite satisfactory. Also, the sheet exhibited substantially no tensile yield stress and a low creep of 4%.

As a result of the microscopic observation tests (6) and (7), it was confirmed that the polyamide component (c) was in the form of fine fibers having average thickness of 0.3 μm.

The test results are shown in Table 3.

Example 10

The same procedures and tests as in Example 1 were carried out except that the elastic component (a) consisted of 100 parts by weight of an acrylonitrile-butadiene copolymer rubber available under the trademark of N-520, from Nihon Goseigomu K. K., and having a glass transition temperature of −46° C.

The precursory composition was extruded into the thread form at the same draft ratio as in Example 1, and pelletized. The resultant thermoplastic elastomer composition pellets were press-formed into a sheet at a temperature of 180° C. in the same manner as in Example 1. The resultant sheet was then subjected to the tests.

In this example, the resultant fine fiber-reinforced elastomer composition sheet had a tensile modulus of elasticity of 4220 kg/cm² and a tensile strength of 101 kg/cm², which are quite satisfactory. Also, the sheet exhibited substantially no tensile yield stress and a very low creep of 3%.

As a result of the microscopic observation tests (6) and (7), it was confirmed that the polyamide component (c) was in the form of fine fibers having an average thickness of 0.3 μm.

The test results are shown in Table 3.

Example 11

The same procedures and tests as in Example 1 were carried out except that the elastic component (a) consisted of 100 parts by weight of a hydric rubber available under the trademark of Epichlomer C, from Daiso K. K., and having a glass transition temperature of −25° C.

The precursory composition was extruded into the thread form at the same draft ratio as in Example 1, and pelletized. The resultant thermoplastic elastomer composition pellets were press-formed into a sheet at a temperature of 180° C. in the same manner as in Example 1. The resultant sheet was then subjected to the tests.

In this example, the resultant fine fiber-reinforced thermoplastic elastomer composition sheet had a tensile modulus of elasticity of 4570 kg/cm² and a tensile strength of 114 kg/cm², which are excellent. Also, the sheet exhibited substantially no tensile yield stress and a very low creep of 2%.

As a result of the microscopic observation tests (6) and (7), it was confirmed that the polyamide component (c) was in the form of fine fibers having an average thickness of 0.3 μm.

The test results are shown in Table 3.

TABLE 3

| Item | | Example No. Example | | |
|---|---|---|---|---|
| | | 9 | 10 | 11 |
| Composition (parts by weight) | Polyolefin component (b) | 100 | 100 | 100 |
| | Elastic component (a) | | | |
| | NR (*)$_4$ | 100 | — | — |
| | NBR (*)$_5$ | — | 100 | — |
| | Hydric rubber | — | — | 100 |
| | Polyamide component (c) | 100 | 100 | 100 |
| Test result | Density g/ml | 0.976 | 1.000 | 1.083 |
| | Tensile modulus of elasticity (kg/cm$^2$) | 4050 | 4220 | 4570 |
| | Tensile yield stress (kg/cm$^2$) | — | — | — |
| | Tensile strength (kg/cm$^2$) | 103 | 107 | 114 |
| | Creep (%) | 4 | 3 | 2 |
| Polyamide component (c) | Fine fiber-formation | Good | Good | Good |
| | Average thickness of fine fibers (μm) | 0.3 | 0.3 | 0.3 |
| Formability (at 180° C.) | | 4 | 4 | 4 |

Note:
(*)$_4$ . . . NR: Natural rubber
(*)$_5$ . . . NBR: Acrylonitrile-butadiene copolymer rubber Example 12

The same procedures and tests as in Example 1 were carried out except that the polyolefin component (b) consisted of an ethylene-vinyl acetate copolymer available under the trademark of EVA copolymer 215, from Ube Industries, Ltd., and having a Vicat softening temperature of 73° C. and a meltflow index of 2 g/10 min.

The precursory composition was extruded into the thread form at the same draft ratio as in Example 1, and pelletized. The resultant thermoplastic elastomer composition pellets were press-formed into a sheet at a temperature of 180° C. in the same manner as in Example 1. The resultant sheet was then subjected to the tests.

In this example, the resultant fine fiber-reinforced thermoplastic elastomer composition sheet had a tensile modulus of elasticity of 1850 kg/cm$^2$ and a tensile strength of 101 kg/cm$^2$, which are satisfactory. Also, the sheet exhibited substantially no tensile yield stress and a creep of 10%.

As a result of the microscopic observation tests (6) and (7), it was confirmed that the polyamide component (c) was in the form of fine fibers having an average thickness of 0.3 μm.

The test results are shown in Table 4.

Example 13

The same procedures and tests as in Example 1 were carried out except that the polyolefin component (b) consisted of a polyethylene resin available under the trademark of Ube Polyethylene FO19, from Ube Industries, Ltd., and having a melting point of 107° C. and a melt-flow index of 0.9 g/10 min.

The polyolefin component (b) was modified with 0.5 part by weight of γ-methacryloxy-propyltrimethoxysilane and 0.1 parts by weight of n-butyl-4,4-di(tert-butylperoxy) valerate, per 100 parts of the polyolefin component (b), by melt-kneading at a temperature of 150° C. by using single screw extruder.

The polyamide component (c) was modified in the same manner as in Example 1.

The precursory composition was extruded into the thread form at the same draft ratio of 10 as in Example 1, and pelletized. The resultant elastomer composition pellets were press-formed into a sheet at a temperature of 180° C. in the same manner as in Example 1. The resultant sheet was then subjected to the tests.

In this example, the resultant fine fiber-reinforced thermoplastic elastomer composition sheet had a tensile modulus of elasticity of 1910 kg/cm$^2$ and a tensile strength of 101 kg/cm$^2$, which are satisfactory. Also, the sheet exhibited substantially no tensile yield stress and a low creep of 10%.

As a result of the microscopic observation tests (6) and (7), it was confirmed that the polyamide component (c) was in the form of fine fibers having an average thickness of 0.2 μm.

The test results are shown in Table 4.

Comparative Example 4

The same procedures and tests as in Example 13 were carried out except no polyamide component (c) was employed.

The precursory composition was extruded into the thread form at the same draft ratio as in Example 1, and pelletized. The resultant thermoplastic elastomer composition pellets were press-formed into a sheet at a temperature of 180° C. in the same manner as in Example 1. The resultant sheet was then subjected to the tests.

In this comparative example, the resultant fine fiber-reinforced thermoplastic elastomer composition sheet had a tensile modulus of elasticity of 362 kg/cm$^2$ and a tensile strength of 56 kg/cm$^2$, which are unsatisfactory. Also, during the creep test (5), the specimen was broken.

The test results are shown in Table 4.

Comparative Example 5

The same procedures and tests as in Example 12 were carried out except no polyamide component (c) was employed.

The precursory composition was extruded into the thread form at the same draft ratio as in Example 1, and pelletized. The resultant thermoplastic elastomer composition pellets were press-formed into a sheet at a temperature of 180° C. in the same manner as in Example 1. The resultant sheet was then subjected to the tests.

In this comparative example, the resultant fine fiber-reinforced thermoplastic elastomer composition sheet had a tensile modulus of elasticity of 254 kg/cm$^2$ and a tensile strength of 74 kg/cm$^2$, which are unsatisfactory. Also, during the creep test (5), the specimen was broken.

The test results are shown in Table 4.

TABLE 4

| | | Example | | Comparative Example | |
|---|---|---|---|---|---|
| Item | | 12 | 13 | 4 | 5 |
| Composition (parts by weight) | Polyolefin component (b) | | | | |
| | PE (*)₆ | — | 100 | 100 | — |
| | EVA (*)₇ | 100 | — | — | 100 |
| | Elastic component (a) | 100 | 100 | 100 | 100 |
| | Polyamide component (c) | 100 | 100 | — | — |
| Test result | Density g/ml | 0.959 | 0.963 | 0.890 | 1.083 |
| | Tensile modules of elasticity (kg/cm²) | 1850 | 1910 | 362 | 254 |
| | Tensile yield stress (kg/cm²) | — | — | — | — |
| | Tensile strength (kg/cm²) | 101 | 101 | 56 | 114 |
| | Creep (%) | 10 | 10 | Broken | Broken |
| Polyamide component (c) | Fine fiber-formation | Good | Good | — | — |
| | Average thickness of fine fibers (μm) | 0.3 | 0.2 | — | — |
| Formability (at 180° C.) | | 4 | 4 | 2 | 2 |

Note:
(*)₆ ... PE: Polyethylene
(*)₇ ... EVA: Ethylene-vinyl acetate copolymer

In the following examples and comparative examples, six types of fine fiber-reinforced thermoplastic elastomer compositions were prepared and employed to prepare fine fiber-reinforced elastic materials.

(1) Preparation of fine fiber-reinforced thermoplastic elastomer compositions (Nos. 1–6)

[Thermoplastic elastomer composition No. 1]

As an elastic component (a), a natural rubber (trademark SMR-L) having a glass transition temperature of −63° C. was employed. As a polyolefin component (b), polypropylene resin (trademark: Ubepolypro J109, made by Ube Industries, Ltd.) having a melting temperature of 165° C. to 170° C. and a meltflow index of 9 g/10 min was employed. Also, as a polyamide component (c), Nylon 6 resin (trademark: Ubenylon 1030B, made by Ube Industries, Ltd.) having a melting temperature of 215° C. to 220° C. and a molecular weight of 30,000, was employed.

The polyolefin component (b) was modified with 0.5 part by weight of γ-methacryloxypropyltri-methoxysilane and 0.1 part by weight of n-butyl-4,4-di(tert-butylperoxy) valerate, per 100 parts by weight of the polyolefin component (b), by melt-kneading at a temperature of 180° C. by using a single screw extruder.

The polyamide component (c) was modified with 1.0 parts by weight of N-β(aminoethyl)γ-aminopropyltrimethoxysilane per 100 parts by weight of the component (c) by melt-kneading at a temperature of 240° C. by using a single screw extruder.

The modified polyolefin component (b) in the amount of 100 parts by weight was mixed with 100 parts by weight of the elastic component (a), and the mixture was melt-kneaded by a Banbury mixer at a temperature of 180° C. for 5 minutes to provide a matrix mixture. The matrix mixture was damped at a temperature of 170° C. and then pelletized.

The matrix mixture pellets were mixed with 100 parts by weight of the modified polyamide component (c), and the mixture was melt-kneaded by a biaxial kneader at a temperature of 240° C. and then pelletized to provide a precursory composition. The precursory composition pellets were melt extruded by a monoaxial extruder into a thread form, while cooling and taking-up at a draft ratio of 10, and then pelletized by using a pelletizer.

The resultant fine fiber-reinforced thermoplastic elastomer composition specimen was subjected to the tests (6) and (7) wherein the elastic component (a) and the polyolefin component (b) were removed by the mixed solvent consisting of o-dichlorobenzene and xylene, and the remaining polyamide component (c) was observed by the microscope. It was confirmed that the polyamide component (c) was formed into fine fibers having an average thickness of 0.2 μm.

[Thermoplastic elastomer composition No. 2]

The same procedures as for the thermoplastic elastomer composition No. 1 were carried out except that the polyamide component (c) (nylon 6) was employed in an increased amount of 200 parts by weight per 100 parts by weight of the polyolefin component (b).

The resultant pellets were treated with a mixed solvent comprising o-dich-lorobezene and xylene while refluxing, to remove the elastic component (a) and the polyolefin component (b), and the remaining polyamide component (c) was subjected to the tests (6) and (7).

It was confirmed that the polyamide component (c) was in the form of fine fibers having an average thickness of 0.2 μm.

[Thermoplastic elastomer composition No. 3 (comparative)]

The same procedures as for the elastomer composition No. 1 were carried out except that the elastic component (a) (natural rubber) was employed in an amount of 100 parts by weight, the polyamide component (c) (nylon 6) was employed in an amount of 50 parts by weight per 100 parts by weight of the polyolefin component (b), and no polyolefin component (b) was employed.

The resultant thermoplastic elastomer composition was treated with a mixed solvent comprising o-dichlorobezene and xylene while refluxing, to remove the elastic component (a) and the polyolefin component (b), and the remaining polyamide component (c) was subjected to the tests (6) and (7).

It was confirmed that the polyamide component (c) was in the form of fine fibers having an average thickness of 0.2 µm.

The thermoplastic elastomer composition No. 3 could not be pelletized at all.

[Thermoplastic elastomer composition No. 4]

The same procedures as for the thermoplastic elastomer composition No. 1 were carried out except that the elastic component (a) (natural rubber) was employed in an amount of 100 parts the polyolefin component (b) was employed in an amount of 75 parts by weight and the polyamide component (c) (nylon 6) was employed in an amount of 87.5 parts by weight.

The resultant pellets were treated with a mixed solvent comprising o-dichlorobezene and xylene while refluxing, to remove the elastic component (a) and the polyolefin component (b), and the remaining polyamide component (c) was subjected to the tests (6) and (7).

It was confirmed that the polyamide component (c) was in the form of fine fibers having an average thickness of 0.2 µM.

The composition of the thermoplastic elastomer compositions Nos. 1 to 4 and the form of the polyamide component (c) in the compositions are shown in Table 5.

pelletized, to provide a precursory composition. The precursory composition pellets were melt extruded by a single screw extruder into a thread form, while cooling and taking-up at a draft ratio of 10, and then pelletized by using a pelletizer.

The resultant fine fiber-reinforced thermoplastic elastomer composition specimen was subjected to the tests (6) and (7) wherein the elastic component (a) and the polyolefin component (b) are removed by the mixed solvent consisting of o-dichlorobenzene and xylene, and the remaining polyamide component (c) was observed by the microscope. It was confirmed that the polyamide component (c) was formed into fine fibers having an average thickness of 0.2 µm.

[Thermoplastic elastomer composition No. 6]

As an elastic component (a), 100 parts by weight of the natural rubber (trademark SMR-L) was employed. As a polyolefin component (b), 75 parts by weight of the same high density polyethylene resin as mentioned above was employed. Also, as a polyamide component (c), the same Nylon 6 resin as mentioned above was employed in an amount of 130 parts by weight.

The elastic component (a) in an amount of 100 parts by weight and 75 parts by weight of the polyolefin component (b) were mixed with 0.75 part by weight of

TABLE 5

| Item | | | Thermooplastic elastomer composition No. | | | | | |
|------|---|---|---|---|---|---|---|---|
| | | | 1 | 2 | 3 | 4 | 5 | 6 |
| Composition (parts by weight) | Polyolefin component (b) | PP (*)$_8$ | 100 | 100 | — | 75 | — | — |
| | | HDPE (*)$_9$ | — | — | — | — | 75 | 75 |
| | Elastic component (a) (*)$_{10}$ (NR) | | 100 | 100 | 100 | 100 | 100 | 100 |
| | Polyamide, component (c) (*)$_{11}$ | | 100 | 200 | 50 | 87.5 | 87.5 | 130 |
| Possibility of being pelletized | | | Possible | Possible | Impossible | Possible | Possible | Possible |
| Polyamide component (c) | Form | | Fine fibers | Fine fibers | Fine fibers | Fine fibers | Fine fibers | Fine fibers |
| | Average thickness (µm) | | 0.2 | 0.2 | 0.2 | 0.2 | 0.2 | 0.2 |
| | Length (µm) | | >15 | >15 | >15 | >15 | >15 | >15 |

Note:
(*)$_8$ . . . PP: Polypropylene
(*)$_9$ . . . HPPE: High density polyethylene
(*)$_{10}$ . . . NR: Natural rubber
(*)$_{11}$ . . . Nylon 6

[Thermoplastic elastomer composition No. 5]

As an elastic component (a), 100 parts by weight of the natural rubber (trademark SMR-L) was employed. As a polyolefin component (b), a high density polyethylene resin (trademark: Chemilets HD 3070, made by Maruzene Polymer K. K.) having a melting temperature of 130° C. and a meltflow index of 8 g/10 min was employed in an amount of 75 parts by weight. Also, as a polyamide component (c), Nylon 6 resin (trademark: Ubenylon 1030B, made by Ube Industries, Ltd.) having a melting temperature of 215° C. to 220° C. and a molecular weight of 30,000, was employed in an amount of 87.5 parts by weight.

The elastic component (a) in an amount of 100 parts by weight and 75 parts by weight of the polyolefin component (b) were mixed with 0.56 part by weight of γ-methacryloxypropyltri-methoxysilane and 0.1 part by weight of n-butyl-4,4-di(tert-butylperoxy)valerate, and the mixture was melt-kneaded in a Banbury mixer at a temperature of 180° C. for 5 minutes, to provide a matrix mixture. The matrix mixture was melt-kneaded together with 87.5 parts by weight of the non-modified polyamide component (c) in a biaxial kneader at a temperature of 245° C., and γ-methacryloxypropyltri-methoxysilane and 0.1 part by weight of n-butyl-4,4-di(tert-butylperoxy)valerate, and 130 parts by weight of the non-modified polyamide component (c), and the mixture was kneaded in a Banbury mixer at a temperature of 240° C. for 5 minutes, and then damped at a temperature of 260° C. and pelletized to provide a precursory composition. The precursory composition pellets were melt extruded by a monoaxial extruder into a thread form at a temperature of 245° C., while cooling and taking-up at a draft ratio of 10, and then pelletized by using a pelletizer.

The resultant fine fiber-reinforced thermoplastic elastomer composition pellets were subjected to the tests (6) and (7) wherein the elastic component (a) and the polyolefin component (b) were removed by the mixed solvent consisting of o-dichlorobenzene and xylene, and the remaining polyamide component (c) was observed by the microscope. It was confirmed that the polyamide component (c) was formed into fine fibers having an average thickness of 0.2 µm.

Examples 14 to 19

In each of Examples 14 to 19, the elastomer composition of the type indicated in Table 6, an additional elastic component (B) consisting of the same natural rubber as for the elastic component (a) and thus having a glass transition temperature of −63° C., a carbon black (HAF), a process oil, zinc oxide, stearic acid, an anti-oxidant consisting of N-phenyl-N'-isopropyl-p-phenylenediamine (available under the trademark of 810-NA, from OUCHI SINKO CHEMICAL INDUSTRIES CO., LTD), sulfur (vulcanizing agent), and a vulcanizing accelerator consisting of N-oxydiethylene-2-benzothiazolylsulpheneamide (available under the trademark of Vulcanizing acceleration NS from OUCHI SINKO CHEMICAL INDUSTRIES CO., LTD) were mixed altogether in the amounts indicated in Table 6. In the mixing procedure, first, the natural rubber and the fine fiber-reinforced thermoplastic elastomer composition were kneaded in a Brabender Plastograph adjusted to a temperature of 160° C. for 30 seconds, then to the mixture, the carbon black, process oil, zinc oxide, stearic acid and anti-aging agent were successively admixed, the admixture was kneaded for 4 minutes, the admixture was further mixed with sulfur an the vulcanizing accelerator on an open kneading roll at a temperature of 80° C.

The resultant mixture was vulcanized at a temperature of 145° C. for 30 minutes. A fine fiber-reinforced elastic material was obtained.

The resultant fine fibers of the polyamide component (c) were in the content indicated in Table 6, based on the total weight of the elastic component (a) and the additional elastic component (B), in the range of from 5% by weight (Example 14) to 50% by weight (Example 19).

In the resultant elastic materials of Examples 13 to 18, the polyamide component (c) consisting of nylon 6 was uniformly distributed in the form of fine fibers in the matrix comprising the natural rubber (NR).

The resultant elastic material was subjected to the measurements of modulus of elasticity (100% modulus and 300% modulus), tensile strength and ultimate elongation as mentioned above.

The 100% modules and 300% modules in Examples 14 to 19 were significantly higher than those in comparative elastic material which was free from the polyamide component (c). Namely, in Examples 14 to 19, the 100% modulus was 66 kg/cm$^2$ (Example 14) to 254 kg/cm$^2$ (Example 19) which was significantly higher than that of the comparative elastic material free from the polyamide component (c) fine fibers, namely, 21 kg/cm$^2$. Similar results to the 100% modulus were obtained on the 300% modulus.

The test results are shown in Table 6.

Comparative Example 6

The thermoplastic elastomer composition No. 3 indicated in Table 6, an additional elastic component (B) consisting of the same natural rubber as for the elastic component (a), a carbon black (HAF), a process oil, zinc oxide, stearic acid, an anti-aging, agent consisting of N-phenyl-N'-isopropyl-p-phenylenediamine sulfur (vulcanizing agent), and a vulcanizing accelerator consisting of N-oxydiethylene-2-benzothiazolylsulpheneamide were mixed altogether in the amounts indicated in Table 6. In the mixing procedure was carried out in the same manner as in Example 14.

The resultant mixture was vulcanized at a temperature of 145° C. for 30 minutes. A fine fiber-reinforced elastic material was obtained.

The resultant fine fibers of the polyamide component (c) was 30% by weight based on the total weight of the elastic component (a) and the additional elastic component (B). It was confirmed that the fine fibers of the polyamide component (c) consisting of nylon 6 were unevenly distributed in the matrix comprising the natural rubber (NR).

The resultant elastic material was subjected to the measurements of modulus of elasticity (100% modulus and 300% modulus), tensile strength and ultimate elongation as mentioned above.

Although the 100% modulus was 174 kg/cm$^2$ which was satisfactory, the ultimate elongation was 110% which was too low.

The test results are shown in Table 6.

Comparative Example 7

An elastic material was prepared by the same procedures as in Example 14, except that no fine fiber-reinforced thermoplastic elastomer composition (A) was employed and the additional elastic component (B) consisting of the same natural rubber as in Example 13 was employed in an increased content of 100 parts by weight. The resultant elastic material was free from the reinforcing fine fibers of the polyamide component (C).

The resultant elastic material had a 100% modulus of 21 kg/cm$^2$ and a 300% modulus of 109 kg/cm$^2$, which are extremely low in composition with those of Examples 14 to 19 and quite unsatisfactory.

The test results are shown in Table 6.

Example 20

A fine fiber-reinforced elastic material was prepared and tested by the same procedures as in Example 14, except that the additional elastic component (B) consisted of 75 parts by weight of the natural rubber and 20 parts by weight of a butadiene rubber (BR, available under the trademark of Ubepol BR 150, from Ube Industries Ltd.), and having a glass transition temperature of −108° C.

The resultant fine fibers of the polyamide component (c) were in the content of 5% by weight, based on the total weight of the elastic component (a) and the additional elastic component (B).

In the resultant elastic materials, the polyamide component (c) consisting of nylon 6 was uniformly distributed in the from of fine fibers in the matrix.

The resultant elastic material was subjected to the measurements of modulus of elasticity (100% modulus and 300% modulus), tensile strength and ultimate elongation as mentioned above.

The 100% modulus was 62 kg/cm$^2$, the 300% modulus was 182 kg/cm$^2$, and the ultimate elongation was 450%, which were all satisfactory. The test results are shown in Table 6.

Comparative Example 8

An elastic material was prepared and tested by the same procedures as in Example 20, except that in the additional elastic component (B), the natural rubber was employed in an amount of 80 parts by weight, and no fine fiber-reinforced thermoplastic elastomer composition was employed. The resultant elastic material was free from the reinforcing fine fibers.

The resultant elastic material was subjected to measurements of the 100% and 300% moduluses, the tensile strength and the ultimate elongation.

The resultant 100% modulus was 27 kg/cm$^2$ and the 300% modulus was 131 kg/cm$^2$, which were significantly lower than those of Example 20.

Example 21 and 22

In Example 21, the same procedures and tests as in Example 14 were carried out, except that the fine fiber-reinforced thermoplastic elastomer composition No. 5 was employed in a content of 15 parts by weight in place of the thermoplastic elastomer composition No. 1.

The fine fibers of the polyamide component (c) were in a content of 5% by weight based on the total weight of the elastic component (a) and the additional elastic component (B), and uniformly distributed in the knead-mixed elastic components (a) and (B).

The test results are shown in Table 6.

In Example 22, the same procedures and tests as in Example 14 were carried out, except that the fine fiber-reinforced thermoplastic elastomer composition No. 6 was employed in a content of 11.7 parts by weight in place of the thermoplastic elastomer composition No. 1, and the additional elastic component (B) was employed in a content of 96.2 parts by weight.

The fine fibers of the polyamide component (c) were in a content of 5% by weight based on the total weight of the elastic compound (a) and the additional elastic component (B), and uniformly distributed in the knead-mixed elastic components (a) and (B).

The test results are shown in Table 6.

NA, from OUCHI SINKO CHEMICAL INDUSTRIES CO., LTD.), sulfur (vulcanizing agent), and a vulcanizing accelerator consisting of N-oxydiethylene-2-benzothiazolylsulpheneamide (available under the trademark of Vulcanizing accelerator NS, from OUCHI SINKO CHEMICAL INDUSTRIES CO., LTD.) were mixed altogether in the amounts indicated in Table 7. The mixing procedure and the vulcanizing procedure were carried out in the same manner as in Example 14. A fine fiber-reinforced elastic material as obtained.

The resultant fine fibers of the polyamide component (c) were in a content of 3% by weight (Example 23) to 7% by weight (Example 25) as indicated in Table 7, based on the total weight of the elastic component (a) and the additional elastic component (B).

In the resultant elastic materials of Examples 23 to 25, the polyamide component (c) consisting of nylon 6 was uniformly distributed in the form of fine fibers in the matrix comprising the natural rubber (NR).

The resultant elastic material was subjected to the measurements of modulus of elasticity (100% modulus 200% modulus and 300% modulus), tensile strength and ultimate elongation and fatigue resistance at a constant rate of loading (load: 70 kg/cm$^2$) as mentioned above.

The tests were carried out not only in a direction parallel to the orientation direction of the polyamide component (c)

TABLE 6

| | | Example No. | | | | | | | | | | | |
| | | Example | | | | | | | | | Comparative Example | | |
| Item | | 14 | 15 | 16 | 17 | 18 | 19 | 20 | 21 | 22 | 6 | 7 | 8 |
| --- | --- | --- | --- | --- | --- | --- | --- | --- | --- | --- | --- | --- | --- |
| Fine fiber-reinforced thermoplastic elastomer composition (A) | Type No. | 1 | 1 | 1 | 2 | 2 | 2 | 1 | 5 | 6 | 3 | — | — |
| | Content (part by wt) | (15) | (30) | (60) | (20) | (60) | (100) | (15) | 15 | 11.7 | (90) | — | — |
| Additional elastic component (B) | Type and content (part by wt) | NR (95) | NR (90) | NR (80) | NR (95) | NR (85) | NR (75) | NR (75) BR (20) | NR (95) | NR (96.2) | NR (40) | NR (100) | NR (80) BR (20) |
| Additive  Carbon black (HAF) | (part by wt) | 40 | 40 | 40 | 40 | 40 | 40 | 40 | 40 | 40 | 40 | 40 | 40 |
| Process oil | | 10 | 10 | 10 | 10 | 10 | 10 | 10 | 10 | 10 | 10 | 10 | 10 |
| Zinc oxide | | 3 | 3 | 3 | 3 | 3 | 3 | 3 | 3 | 3 | 3 | 3 | 3 |
| Stearic acid | | 2 | 2 | 2 | 2 | 2 | 2 | 2 | 2 | 2 | 2 | 2 | 2 |
| Anti-aging agent | | 1 | 1 | 1 | 1 | 1 | 1 | 1 | 1 | 1 | 1 | 1 | 1 |
| Vulcanizing accelerator | | 0.5 | 0.5 | 0.5 | 0.5 | 0.5 | 0.5 | 0.5 | 0.5 | 0.5 | 0.5 | 0.5 | 0.5 |
| Sulfur | | 2.5 | 2.5 | 2.5 | 2.5 | 2.5 | 2.5 | 2.5 | 2.5 | 2.5 | 2.5 | 2.5 | 2.5 |
| Content of polyamide component (c) fine fibers based on the total weight of the elastic component (a) and additional elastic component (B) | (wt %) | 5 | 10 | 20 | 10 | 30 | 50 | 5 | 5 | 5 | 30 | 0 | 0 |
| Fine fiber-formation of polyamide component (c) | Good | Good | Good | Good | Good | Good | Good | Good | Good | Good | Bad | — | — |
| Test  100% modulus | (kg/cm$^2$) | 66 | 105 | 164 | 104 | 216 | 254 | 62 | 68 | 65 | 174 | 21 | 27 |
| 300% modulus | (kg/cm$^2$) | 184 | 219 | 280 | 221 | 302 | — | 182 | 176 | 173 | — | 109 | 131 |
| Tensile strength | (kg/cm$^2$) | 320 | 315 | 310 | 318 | 318 | 285 | 286 | 298 | 300 | 134 | 325 | 290 |
| Ultimate elongation | (%) | 460 | 420 | 370 | 430 | 330 | 140 | 450 | 460 | 460 | 110 | 590 | 560 |

Examples 23 to 25

In each of Examples 23 to 25, the fine fiber-reinforced thermoplastic elastomer composition No. 4 indicated in Table 5, an additional elastic component (B) consisting of the same natural rubber as for the elastic component (a), a carbon black (HAF), a process oil, zinc oxide, stearic acid, an anti-aging agent consisting of N-phenyl-N'-isopropyl-p-phenylenediamine (available under the trademark of 810- fine fibers but also in a direction at a right angle to the orientation direction of the polyamide component (c) fine fibers.

The test results are shown in Table 7. The resultant fine fiber-reinforced elastic material exhibited significantly excellent 100%, 200% and 300% moduli, tensile strength, ultimate elongation and fatigue resistance in comparison with those of Comparative Example 7. Also, it was confirmed that the difference in the moduli and fatigue resistance at a constant rate of loading between the directions parallel to and at a right angle to the orientation direction of the reinforcing fine fibers dispersed in the elastic materials is small.

Comparative Example 9

The same procedures and tests as in Example 23 were carried out except that the fine fiber-reinforced thermoplastic elastomer composition No. 4 was omitted and the additional elastic component (B) (NR) was employed in a content of 100 parts by weight. The resultant elastic material was free from the reinforcing fine fibers.

The test results are shown in Table 7.

With respect to the moduli and the fatigue resistance at a constant rate of loading, substantially no directional difference was found. However, those physical properties were significantly poorer than those of Examples 23 to 25.

dispersed in an amount of 5% by weight based on the total weight of the elastic component (a) and the additional elastic component (B).

The test results are shown in Table 7.

The moduli and tensile strength of the resultant elastic material in the direction parallel to the orientation direction of the fine fibers were about same as those in Example 24.

However, the modulus and the fatigue resistance in the direction at a right angle to the fine fiber orientation direction were significantly lower than those in Examples 23 to 25.

TABLE 7

| | | Example No. | | | | |
|---|---|---|---|---|---|---|
| | | Example | | | Comparative Example | |
| Item | | 23 | 24 | 25 | 9 | 10 |
| Fine fiber-reinforced thermoplastic elastomer composition (A) | Type No. | 4 | 4 | 4 | — | 3 |
| | Content (part by wt) | (9) | (15) | (21) | (—) | (15) |
| Additional elastic component (B) | Type and content (part by wt) | NR (96.6) | NR (94.3) | NR (92) | NR (100) | NR (90) |
| Additive | Carbon black (HAF) | (part by wt) | 40 | 40 | 40 | 40 | 40 |
| | Process oil | | 10 | 10 | 10 | 10 | 10 |
| | Zinc oxide | | 3 | 3 | 3 | 3 | 3 |
| | Stearic acid | | 2 | 2 | 2 | 2 | 2 |
| | Anti-aging agent | | 1 | 1 | 1 | 1 | 1 |
| | Vulcanizing accelerator | | 0.8 | 0.8 | 0.8 | 0.8 | 0.8 |
| | Sulfur | | 1.5 | 1.5 | 1.5 | 1.5 | 1.5 |
| Content of polyamide component (c) fine fibers based on the total weight of the elastic component (a) and additional elastic component (B) | (wt %) | 3 | 5 | 7 | 0 | 5 |
| Fine fiber - formation of polyamide component (c) | | Good | Good | Good | — | Bad |
| Test | Direction with respect ot fine fiber orientation direction | Parallel Normal | Parallel Normal | Parallel Normal | Parallel Normal | Parallel Normal |
| | 100% modulus (kg/cm$^2$) | 44  29 | 61  37 | 91  46 | 24  21 | 64  29 |
| | 200% modulus (kg/cm$^2$) | 102  79 | 123  94 | 158  167 | 73  62 | 115  76 |
| | 300% modulus (kg/cm$^2$) | 168  143 | 187  159 | 219  171 | 136  119 | 166  128 |
| | Tensile strength (kg/cm$^2$) | 272  240 | 262  235 | 258  208 | 298  272 | 271  251 |
| | Ultimate elongation (%) | 480  470 | 430  430 | 370  360 | 560  540 | 530  530 |
| | Fatigue resistance at constant loading rate (Times) | 650  490 | 810  590 | 1180  770 | 360  350 | 810  200 |
| | Tear strength (N/mm) | 78 | 81 | 82 | 76 | — |
| | Hardness (JIS A type) | 70 | 83 | 77 | 61 | 68 |
| | Temperature increase ($\Delta T$) (° C.) | 16 | 18 | 20 | 14 | 20 |

Comparative Example 10

A fine fiber-reinforced elastic material was prepared and tested by the same procedures as in Example 23, except that the fine fiber-reinforced thermoplastic elastomer composition No. 3 containing no polyolefin component (b) was employed in a content of 15 parts by weight and the additional elastic component (B) consisting of the natural rubber was employed in a content of 90 parts by weight.

In the resultant fine fiber-reinforced elastic material, the fine fibers of the polyamide components (c) (nylon 6) are

What is claimed is:
1. A fine fiber-reinforced thermoplastic elastomer composition, comprising
   (a) 100 parts by weight of an elastic component comprising at least one elastic polymer having a glass-transition temperature of 0° C. or less;
   (b) 30 to 500 parts by weight of a polyolefin component comprising at least one polyolefin; and
   (c) 10 to 500 parts by weight of a polyamide component comprising at least one thermoplastic amide polymer having amide group-containing recurring units, the polyamide component (c) being in the form of fine fibers having an average thickness of 1 μm or less and an average aspect ratio of 10 or more, and dispersed in a matrix formed from the elastic component (a) and the polyolefin component (b), and the elastic component (a), the polyolefin component (b) and the polyamide component (c) being chemically bonded to each other, through at least one binding agent (d).

2. The fine fiber-reinforced thermoplastic elastomer composition as claimed in claim 1, wherein the elastic polymer for the elastic component (a) is selected from the group consisting of natural rubber, poly-aliphatic diene elastomers, polyolefin elastomers, polymethylene elastomers, elastomers having an oxygen atom-containing backbone chain, silicone elastomers and elastomers having nitrogen and oxygen atom-containing backbone chain.

3. The fine fiber-reinforced thermoplastic elastomer composition as claimed in claim 1, wherein the polyolefin component (b) has a melting temperature of 80 to 250° C. and lower than the melting temperature of the polyamide compound (c), or a Vicat softening temperature of 50° C. to 200° C.

4. The fine fiber-reinforced thermoplastic elastomer composition as claimed in claim 1, wherein the polyolefin for the polyolefin component (b) is selected from homopolymers and copolymers of olefins having 2 to 8 carbon atoms; copolymers of at least one olefin having 2 to 8 carbon atoms with at least one member selected from the group consisting of aromatic vinyl compounds, vinyl acetate, acrylic acid, acrylic acid esters, methacrylic acid, methacrylic acid esters, and vinyl silane compounds; and halogenated polyolefins.

5. The fine fiber-reinforced thermoplastic elastomer composition as claimed in claim 1, wherein the polyolefin component (b) has a meltflow index of 0.5 to 50 g/10 min.

6. The fine fiber-reinforced thermoplastic elastomer composition as claimed in claim 1, wherein the polyolefin for the polyolefin component (b) is selected from the group consisting of high density polyethylenes, low density polyethylenes, polypropylens, ethylene-propylene block copolymers, ethylene-propylene random copolymers, linear low density polyethylenes, poly(4-methylpentene-1), ethylene-vinyl acetate copolymers, and ethylene-vinyl alcohol copolymers.

7. The fine fiber-reinforced thermoplastic elastomer composition as claimed in claim 1, wherein the thermoplastic amide polymer for the polyamide component (c) has a melting temperature of 135° C. to 350° C.

8. The fine fiber-reinforced thermoplastic elastomer composition as claimed in claim 1, wherein the thermoplastic amide polymer for the polyamide component (c) is selected from the group consisting of nylon 6, nylon 66, nylon 6-nylon 66 copolymers, nylon 610, nylon 612, nylon 46, nylon 11 and nylon 12.

9. The fine fiber-reinforced thermoplastic elastomer composition as claimed in claim 1, wherein in the matrix, the elastic component (a) is dispersed in the form of a plurality of islands in a sea consisting of the polyolefin component (b).

10. The fine fiber-reinforced thermoplastic elastomer composition as claimed in claim 1, wherein at least 70% by weight of the polyamide component (c) is in the form of a plurality of fine fibers dispersed in the matrix.

11. The fine fiber-reinforced thermoplastic elastomer composition as claimed in claim 1, wherein the polyamide component (c) is chemically bonded to the elastic component (a) and the polyolefin component (b) at a binding proportion of 0.1 to 20% by weight.

12. The fine fiber-reinforced thermoplastic elastomer composition as claimed in claim 1, wherein the binding agent (d) comprises at least one member selected from the group consisting of silane coupling agents, titanate coupling agents, phenol-formaldehyde-precondensates, unsaturated carboxylic acids, unsaturated carboxylic acid derivatives and organic peroxides.

13. The fine fiber-reinforced thermoplastic elastomer composition as claimed in claim 1, wherein the binding agent (d) is employed in an amount of 0.1 to 2.0 parts by weight per 100 parts by weight of the polyolefin component (b).

14. The fine fiber-reinforced thermoplastic elastomer composition as claimed in claim 1, wherein the thermoplastic amide polymer for the polyamide component (c) is one modified with a binding agent (d') comprising at least one member selected from the group consisting of silane coupling agents, titanate coupling agents, unsaturated carboxylic acids, unsaturated carboxylic acid derivatives, and organic peroxides.

15. The fine fiber-reinforced thermoplastic elastomer composition as claimed in claim 13, wherein the binding agent (d') is employed in an amount of 0.1 to 5.5 parts by weight per 100 parts by weight of the polyamide component (c).

16. A process for producing a fine fiber-reinforced thermoplastic elastomer composition of claim 1, comprising the steps of:

(1) melt-kneading a mixture comprising (a) 100 parts by weight of an elastic component comprising at least one elastic polymer having a glass-transition temperature of 0° C. or less, (b) 30 to 500 parts by weight of a polyolefin component comprising at least one polyolefin and (d) a binding agent, at a temperature equal to or higher than the melting temperature of the mixture, to provide a matrix mixture;

(2) further kneading the matrix mixture together with (c) 10 to 500 parts by weight of a polyamide component comprising at least one thermoplastic amide polymer having amide group-containing recurring units, at a temperature equal to or higher than the melting temperature of the polyamide component (c), to provide a precursory composition in which the polyamide component (c) is dispersed in the form of fine particles in the matrix mixture; and (3) extruding the precursory composition through an extruding die at a temperature equal to or higher than the melting temperature of the polyamide component (c), while cooling and drawing or press-rolling the extruded precursory composition at a temperature lower than the melting temperature of the polyamide component (c), to form the polyamide component (c) into fine fibers having an average thickness of 1 μm or less and an average aspect ratio of 10 or more, dispersed in a matrix comprising the elastic component (a) and the polyolefin component (b) and to cause the components (a), (b) and (c) to be chemically bonded to each other through the binding agent (d).

17. The process as claimed in claim 16, wherein in the melt-kneading step (1), the polyolefin component (b) is melt-kneaded together with the binding agent (d), and then a mixture of the polyolefin component (b) modified with the binding agent (d) with the elastic component (a) is melt-kneaded at a temperature equal to or higher the melting temperature of the mixture.

18. The process as claimed in claim 16, wherein in the melt-kneading step (1), the elastic component (a), the polyolefin component (b) and the binding agent (d) are mixed altogether and then the mixture is subjected to the melt-kneading procedure.

19. The process as claimed in claim 16, wherein before the further kneading step (2), the polyamide component (c) is modified with a binding agent (d') comprising at least one member selected from the group consisting of silane coupling agents, titanate coupling agents, unsaturated carboxylic acids, unsaturated carboxylic acid derivatives and organic peroxides, by melt-kneading.

20. The process as claimed in claim 19, wherein the binding agent (d') is employed in an amount of 0.1 to 5.5 parts by weight per 100 parts by weight of the polyamide component (c).

21. The process as claimed in claim 16, each of the melt-kneading step (i) and the further kneading step (2) is carried out by using at least one kneading machine selected from the group consisting of a Banbury mixer, kneaders, knead-extruders, open kneading rolls, monoaxial kneaders and biaxial kneaders.

22. The process as claimed in claim 16, wherein the further kneading step (2) is carried out at a temperature higher than the melting temperatures of the elastic component (a) and the polyamide component (c).

23. The process as claimed in claim 16, wherein the further kneading step (2) is carried out at a temperature of at least 30° C. above the melting temperature of the polyamide component (c).

24. The process as claimed in claim 16, wherein in the extruding step (3), the extruding procedure is carried out at a temperature of at least 30° C. above the melting temperature of the polyamide component (c).

25. The process as claimed in claim 16, wherein in the extruding step (3), the extruded composition is drafted at a draft ratio of 1.5 to 100.

26. A fine fiber-reinforced elastic material comprising:
(A) the fine fiber-reinforced thermoplastic elastomer composition as claimed in claim 1, and
(B) an additional elastic component comprising at least one elastic polymer having a glass-transition temperature of 0° C. or less, and knead-mixed with the fine fiber-reinforced elastomer composition (A),
with respect to 100 parts of the total weight of the elastic component (a) and the additional elastic component (B), the polyolefin component (b) being present in an amount of 1 to 40 parts by weight, and the polyamide component (c) being present in an amount of 1 to 70 parts by weight.

27. The fine fiber-reinforced elastic material as claimed in claim 26, wherein the additional elastic component (B) is present in a weight ratio to the fine fiber-reinforced thermoplastic elastomer composition (A) of 20:1 to 0.1:1.

28. The fine fiber-reinforced elastic material as claimed in claim 26, wherein the elastic component (a) and the additional elastic component (B) are vulcanizable.

29. The fine fiber-reinforced elastic material as claimed in claim 26, wherein the elastic component (a) and the additional elastic component (B) are vulcanized.

30. A process for producing a fine fiber-reinforced elastic material, comprising knead-mixing the fine fiber-reinforced thermoplastic elastomer composition (A) as claimed in claim 1 with an additional elastic component (B) comprising at least one elastic polymer having a glass-transition temperature of 0° C. or less, at a temperature of equal to or higher than the melting temperature of the polyolefin component (b) and lower than the melting temperature of the polyamide component (c),
with respect to 100 parts of the total weight of the elastic component (a) and the additional elastic component (B), the polyolefin component (b) being present in an amount of 1 to 40 parts by weight, and the polyamide component (c) being present in an amount of 1 to 70 parts by weight.

31. The process as claimed in claim 30, wherein the fine fiber-reinforced thermoplastic elastomer composition (A) and the additional elastic component (B) are knead-mixed together with (C) a vulcanizing agent, and the resultant mixture is subjected to a vulcanizing procedure at a temperature of 100° C. to 180° C. and lower than the melting temperature of the polyamide component (c).

32. The process as claimed in claim 31, wherein the vulcanizing agent is used in an amount of 0.1 to 5.0 parts by weight per 100 parts of the total weight of the elastic component (a) and the additional elastic component (B).

33. The process as claimed in claim 31, wherein the vulcanizing procedure is carried out in the presence of a vulcanizing accelerator in an amount of 0.01 to 2.0 parts by weight per 100 parts of the total weight of the elastic component (a) and the additional elastic component (B).

* * * * *